United States Patent
Katoh et al.

(10) Patent No.: US 10,507,381 B2
(45) Date of Patent: Dec. 17, 2019

(54) INFORMATION PROCESSING DEVICE, POSITION AND/OR ATTITUDE ESTIMIATING METHOD, AND COMPUTER PROGRAM

(71) Applicants: Sony Corporation, Tokyo (JP); Sony Interactive Entertainment Inc., Tokyo (JP)

(72) Inventors: Hiroshi Katoh, Tokyo (JP); Tetsugo Inada, Tokyo (JP); Tatsuki Kashitani, Tokyo (JP); Takaaki Kato, Tokyo (JP)

(73) Assignees: SONY CORPORATION, Tokyo (JP); SONY INTERACTIVE ENTERTAINMENT INC., Tokyo (JP)

( * ) Notice: Subject to any disclaimer, the term of this patent is extended or adjusted under 35 U.S.C. 154(b) by 70 days.

(21) Appl. No.: 15/761,975

(22) PCT Filed: Oct. 3, 2016

(86) PCT No.: PCT/JP2016/079329
§ 371 (c)(1),
(2) Date: Mar. 21, 2018

(87) PCT Pub. No.: WO2017/061388
PCT Pub. Date: Apr. 13, 2017

(65) Prior Publication Data
US 2018/0272231 A1    Sep. 27, 2018

(30) Foreign Application Priority Data
Oct. 9, 2015  (JP) .................................. 2015-201426

(51) Int. Cl.
*A63F 13/21*    (2014.01)
*A63F 13/211*   (2014.01)
(Continued)

(52) U.S. Cl.
CPC .......... *A63F 13/211* (2014.09); *A63F 13/213* (2014.09); *A63F 13/40* (2014.09);
(Continued)

(58) Field of Classification Search
CPC .................... A63F 13/21; A63F 13/211; A63F 2300/8082; A61B 2090/365
See application file for complete search history.

(56) References Cited

U.S. PATENT DOCUMENTS

| 10,001,834 B2 | 6/2018 | Katz |
| 2001/0055063 A1 | 12/2001 | Nagai |

(Continued)

FOREIGN PATENT DOCUMENTS

| CN | 102656091 A | 9/2012 |
| CN | 105850113 A | 8/2016 |

(Continued)

OTHER PUBLICATIONS

Notification of Reason for Refusal for corresponding JP Application No. 2015-201426, 8 pages, dated Aug. 28, 2016.

(Continued)

*Primary Examiner* — Omkar A Deodhar
(74) *Attorney, Agent, or Firm* — Matthew B. Dernier, Esq.

(57) ABSTRACT

A first estimating unit estimates at least one of a position and an attitude of a predetermined object on the basis of an image of a periphery of the object, the image being obtained from an imaging device, and generates an estimation result not including an accumulated error. A second estimating unit estimates at least one of the position and the attitude of the object on the basis of the image, and generates an estimation result including an accumulated error. A correcting unit compares the estimation result of the first estimating unit and the estimation result of the second estimating unit with (Continued)

each other, and corrects, on the basis of a result of the comparison, a subsequent estimation result of the second estimating unit, the subsequent estimation result being subsequent to the estimation result of the second estimating unit which estimation result is used for the comparison. An App executing unit performs predetermined data processing on the basis of the estimation result of the second estimating unit which estimation result is corrected by the correcting unit.

13 Claims, 13 Drawing Sheets

(51) Int. Cl.
| | | |
|---|---|---|
| *G01B 11/26* | (2006.01) | |
| *G01B 11/00* | (2006.01) | |
| *G06T 19/00* | (2011.01) | |
| *A63F 13/428* | (2014.01) | |
| *A63F 13/40* | (2014.01) | |
| *A63F 13/655* | (2014.01) | |
| *A63F 13/213* | (2014.01) | |
| *A63F 13/212* | (2014.01) | |

(52) U.S. Cl.
CPC .......... *A63F 13/428* (2014.09); *A63F 13/655* (2014.09); *G01B 11/00* (2013.01); *G01B 11/26* (2013.01); *G06T 19/00* (2013.01); *A63F 13/212* (2014.09); *A63F 2300/8082* (2013.01)

(56) References Cited

U.S. PATENT DOCUMENTS

| | | |
|---|---|---|
| 2011/0067157 A1 | 3/2011 | Xiao |
| 2015/0193949 A1 | 7/2015 | Katz |
| 2016/0035140 A1* | 2/2016 | Bickerstaff ............. A63F 13/26 345/633 |
| 2016/0282619 A1 | 9/2016 | Oto |

FOREIGN PATENT DOCUMENTS

| | | |
|---|---|---|
| JP | 2002048513 A | 2/2002 |
| JP | 2005050189 A | 2/2005 |
| JP | 2005252482 A | 9/2005 |
| JP | 2006250917 A | 9/2006 |
| JP | 2010133711 A | 6/2010 |
| JP | 2015095045 A | 5/2015 |

OTHER PUBLICATIONS

International Search Report for corresponding PCT Application No. PCT/JP2016/079329, 5 pages, dated Dec. 20, 2016.
International Preliminary Report on Patentability and Written Opinion for corresponding PCT Application No. PCT/JP2016/079329, 16 pages, dated Apr. 10, 2018.
Extended European Search Report for corresponding EP Application No. 168535425, 7 pages, dated Feb. 12, 2019.
The First Office Action for corresponding CN Application No. 201680058662.1, 16 pages, dated Jul. 3, 2019.

\* cited by examiner

INFORMATION PROCESSING SYSTEM 210

INFORMATION PROCESSING DEVICE, POSITION AND/OR ATTITUDE ESTIMATING METHOD, AND COMPUTER PROGRAM

TECHNICAL FIELD

The present invention relates to a data processing technology, and particularly to an information processing device, a position and/or attitude estimating method, and a computer program.

BACKGROUND ART

A user wearing, on the head of the user, a head-mounted display (hereinafter referred to as an "HMD") connected to a game machine plays a game by operating a controller or the like while viewing a screen displayed on the HMD. In the case of an ordinary stationary display, a visual field range of the user extends also to the outside of a screen of the display. Therefore, it may be impossible to concentrate on the screen of the display, and there may be a lack of a sense of immersion in the game. In that respect, when the user wears the HMD, the user does not view other than video displayed on the head-mounted display. Thus, effects of enhancing a sense of immersion in a video world and further enhancing an entertaining characteristic of the game are obtained.

In addition, when the HMD is provided with a head tracking function, and an image of a virtual space or the like displayed on the screen is updated so as to be interlocked with movement of the head of the user, the sense of immersion in the video is further improved, and operability of an application such as the game or the like is also improved.

CITATION LIST

Patent Literature

[PTL 1] JP 2015-95045A

SUMMARY

Technical Problem

SLAM (Simultaneous Localization And Mapping) is known as a technology for estimating the position and attitude of a predetermined object (for example, an HMD) within a space. SLAM includes a method of tracking the movement of a feature point detected from an image photographed by a camera for each local patch including the feature point, and updating a predetermined state variable in each time step on the basis of the movement of the feature point. When the state variable is set as the position and attitude, moving speed, or angular velocity of the camera, the position of at least one feature point of an object present in a photographed space, or the like, positional relation (for example, a distance and an angle) between the photographed space and a sensor surface of the camera can be obtained from each photographed image.

A plurality of techniques have been proposed for SLAM, and characteristics such as a time necessary for self-position estimation, accuracy, and the like differ according to each technique. However, with SLAM proposed thus far, it is difficult to achieve both quickness and accuracy of self-position estimation.

The present invention has been made in view of such a problem. It is an object of the present invention to provide a technology that assists in achieving both quickness and accuracy of information processing that estimates at least one of a position and an attitude of a predetermined object.

Solution to Problem

In order to solve the above problem, according to a mode of the present invention, there is provided an information processing device including: a first estimating unit configured to estimate at least one of a position and an attitude of a predetermined object on a basis of an image of a periphery of the object, the image being obtained from an imaging device, and generate an estimation result not including an accumulated error; a second estimating unit configured to estimate at least one of the position and the attitude of the object on the basis of the image, and generate an estimation result including an accumulated error; a correcting unit configured to compare the estimation result of the first estimating unit and the estimation result of the second estimating unit with each other, and correct, on a basis of a result of the comparison, a subsequent estimation result of the second estimating unit, the subsequent estimation result being subsequent to the estimation result of the second estimating unit, the estimation result being used for the comparison; and a data processing unit configured to perform predetermined data processing on a basis of the estimation result of the second estimating unit, the estimation result being corrected by the correcting unit.

Another mode of the present invention is a position and/or attitude estimating method. The method performed by a computer includes: a step of performing first estimation processing that estimates at least one of a position and an attitude of a predetermined object on a basis of an image of a periphery of the object, the image being obtained from an imaging device, and generates an estimation result not including an accumulated error; a step of performing second estimation processing that estimates at least one of the position and the attitude of the object on the basis of the image, and generates an estimation result including an accumulated error; and a step of comparing the estimation result of the first estimation processing and the estimation result of the second estimation processing with each other, and correcting, on a basis of a result of the comparison, a subsequent estimation result of the second estimation processing, the subsequent estimation result being subsequent to the estimation result of the second estimation processing, the estimation result being used for the comparison.

It is to be noted that arbitrary combinations of the above constituent elements as well as modes obtained by converting expressions of the present invention between a system, a computer program, a recording medium storing the computer program, and the like are also effective as modes of the present invention.

Advantageous Effect of Invention

According to the present invention, it is possible to assist in achieving both quickness and accuracy of information processing that estimates at least one of a position and an attitude of a predetermined object.

DESCRIPTION OF EMBODIMENT

Figure 1:
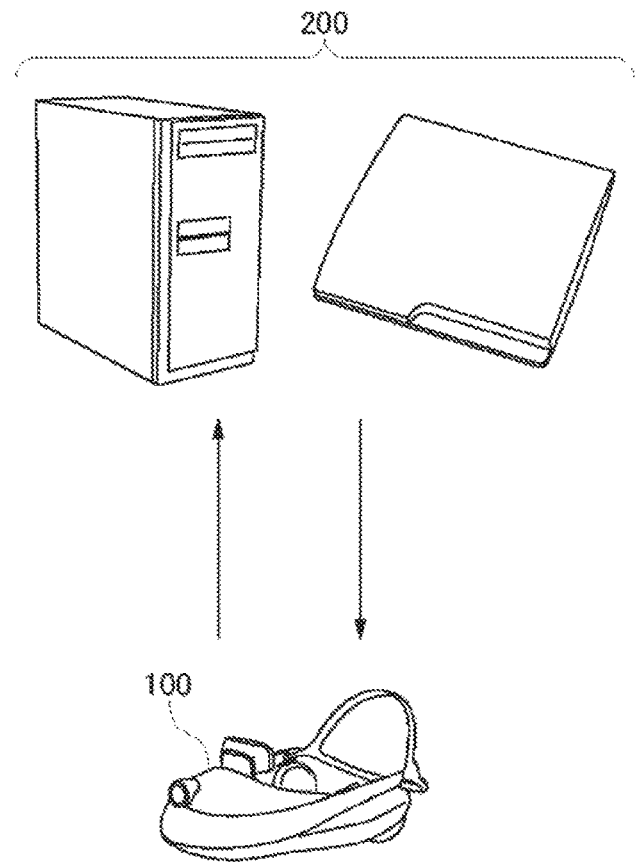
FIG. 1 is a diagram depicting a configuration of an information processing system according to an embodiment.

An outline will first be described. An HMD desirably presents an image that follows the movement of a head of a user to enhance a sense of immersion of the user in VR (Virtual Reality) or AR (Augmented Reality). It is therefore necessary to obtain, in real time, information about the position and attitude (that can also be said to be the orientation) of the HMD or the position and attitude of the user wearing the HMD.

As a method of tracking the position and attitude of the HMD, there is a method of imaging the HMD from a camera fixed at a predetermined position outside the HMD and tracking a manner in which an LED (Light Emitting Diode) group mounted on the HMD is viewed. However, this system has a limitation in that it is impossible to deal with the movement of the HMD that goes off the angle of view of the fixed camera.

In a system according to an embodiment, with an objective of eliminating the limitation on the movement of an HMD, the position and attitude of the HMD is tracked by analyzing the video of a camera mounted on the HMD by SLAM. Specifically, an image of a real space surrounding the HMD which image is imaged by the camera is used as main input, output information of an acceleration sensor, an angular velocity sensor, a geomagnetic sensor, and the like is used as auxiliary input, ambient environment information is successively constructed, and self-position estimation processing is performed. Incidentally, while the self-position estimation processing according to the embodiment estimates both the position and attitude of a predetermined object (specifically the HMD), a configuration may be adopted in which one of the position and attitude of the predetermined object is estimated.

A plurality of techniques have been proposed for SLAM, and the characteristics of SLAM differ depending on the techniques. For example, in a publicly known technique of SLAM (hereinafter referred to as "first SLAM"), each time of self-position estimation processing estimates, independently of the other, the absolute position of the self (HMD in the embodiment) in a world coordinate system. First SLAM has characteristics of requiring a relatively long time (for example, 45 milliseconds or more) from input of a camera image to output of a result of self-position estimation but having no accumulation of errors. In other words, first SLAM has a characteristic of producing an estimation result not including an accumulated error (cumulative error). Because there is no accumulation of errors, a deviation width between the estimation result and a true value is unrelated to the passage of time, and the self-position estimation in a long period has a relatively high degree of accuracy. The long period is, for example, equal to or more than 5 seconds, and is, for example, equal to or more than a time taken to perform 100 times of self-position estimation processing.

Another publicly known technique of SLAM (hereinafter referred to as "second SLAM") estimates the relative position of the self in the world coordinate system on the basis of a difference in each self-position estimation result. Second SLAM has characteristics of requiring a relatively short time (for example, within 15 milliseconds) from input of a camera image to output of a result of self-position estimation but having errors accumulated. In other words, second SLAM has a characteristic of producing an estimation result including an accumulated error. Because the gradually accumulated error is reflected in the estimation result, a deviation width between the estimation result and a true value tends to increase with the passage of time, and the self-position estimation in a long period has a relatively low degree of accuracy. For example, the later the time point of the estimation result is, the larger the deviation from a true position and attitude tends to be, in a case where the self-position estimation processing is repeated and the estimation result is output a plurality of times.

Thus, at present, there is no SLAM technique that achieves both quickness and accuracy of self-position estimation. Accordingly, the system according to the embodiment corrects an estimation result of second SLAM which estimation result includes an accumulated error, by using an estimation result of first SLAM which estimation result includes no accumulated error. Both the quickness and accuracy of self-position estimation are achieved by thus performing information processing that complements the weaknesses of both first SLAM and second SLAM having different characteristics while using first SLAM and second SLAM in combination with each other. In the embodiment, description will be made supposing that an object for self-position estimation is an HMD worn by a user. However, the technology of self-position estimation according to the embodiment is applicable to various objects. Part of the various objects will be described in modifications in later paragraphs.

FIG. 1 depicts a configuration of an information processing system 210 according to the embodiment. In the information processing system 210, a game machine 200 functions as an information processing device (image generating device) that generates a VR image, and an HMD 100 functions as an information processing device (image display device) that displays the VR image. The HMD 100 is connected to the game machine 200 by wireless communication or a wire interface such as USB (Universal Serial Bus) or the like. The game machine 200 may be further connected to a server via a communication network such as the Internet or the like. In that case, the server may provide the game machine 200 with an online application of a game or the like in which a plurality of users can participate via the communication network. The image generating device may be implemented by a PC (Personal Computer) or a portable terminal in place of the game machine 200.

Figure 2:
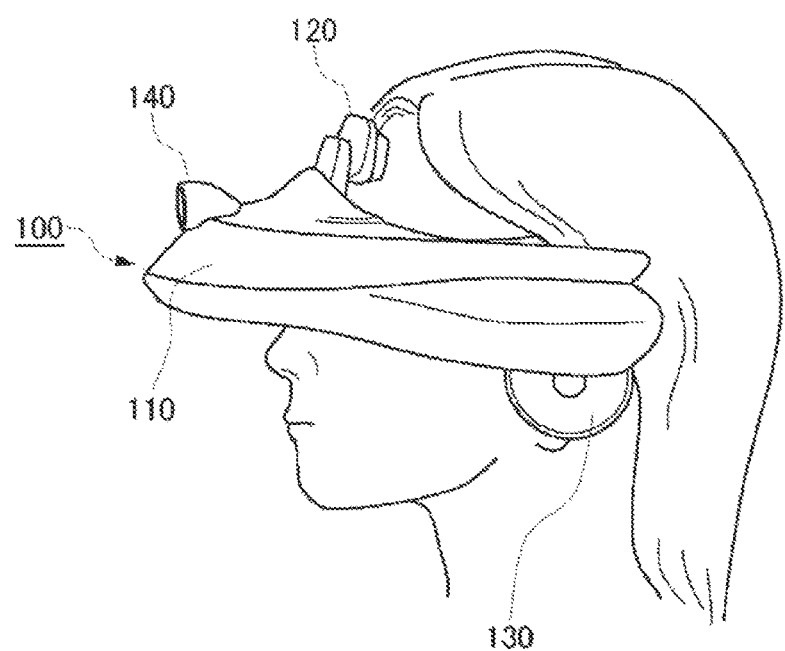
FIG. 2 is a diagram depicting an external appearance of an HMD.

FIG. 2 depicts an external appearance of the HMD 100. The HMD 100 includes a main body portion 110, a frontal region contact portion 120, a temporal region contact portion 130, and a camera 140. The main body portion 110 includes various modules to be described later with reference to FIG. 3. The camera 140 is an imaging device that is disposed on a front portion of the HMD 100 and which images the state of the outside while a user wears the HMD 100. Various shapes such as an eyeglass shape, a helmet shape, and the like are assumed for the HMD 100.

Figure 3:
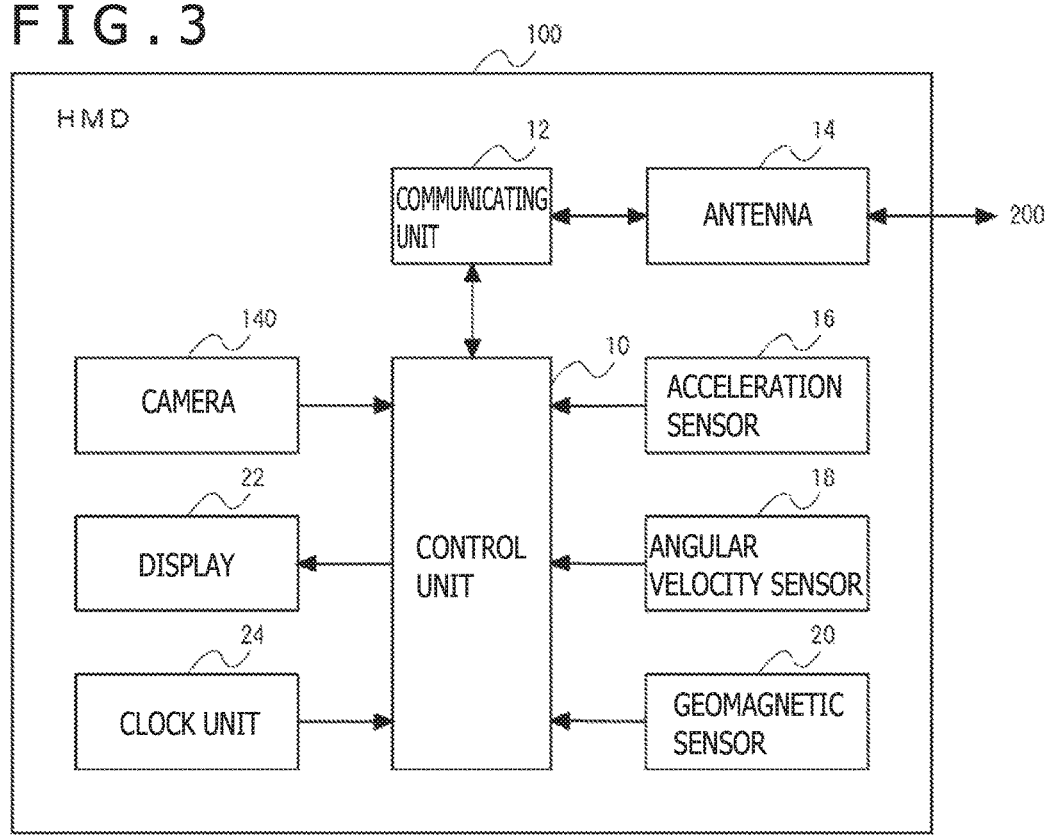
FIG. 3 is a function block diagram depicting a configuration of the HMD.

FIG. 3 is a function block diagram depicting a configuration of the HMD 100. The HMD 100 includes a control unit 10, a communicating unit 12, an antenna 14, an acceleration sensor 16, an angular velocity sensor 18, a geomagnetic sensor 20, the camera 140, a display 22, and a clock unit 24. Each block depicted in the block diagrams of the present specification can be implemented by an element, an electronic circuit, or a mechanical device, including a CPU (Central Processing Unit) and a memory of a computer, in terms of hardware, and implemented by a computer program or the like, in terms of software. However, functional blocks implemented by cooperation of hardware and software are depicted here. Hence, it is to be understood by those skilled in the art that these functional blocks can be implemented in various forms by combinations of hardware and software.

The communicating unit 12 performs communication processing with an external device via the antenna 14. The control unit 10 transmits and receives various kinds of data to and from the game machine 200 via the communicating unit 12. Incidentally, wire communication may be performed instead of wireless communication.

The acceleration sensor 16, the angular velocity sensor 18 (gyro sensor), and the geomagnetic sensor 20 output data indicating the acceleration, angular velocity, and orientation of the HMD (these pieces of data will be referred to also as "sensor data" when referred to collectively) to the control unit 10. Suppose that 1000 samples are output per second as the sensor data.

The camera 140 images the state of a real space (in other words, the outside) surrounding the HMD 100, and outputs image data (hereinafter referred to also as a "camera image") depicting the state of the outside to the control unit 10. The camera 140 may be a stereo camera in which two lenses form one set, or may be a three-dimension camera that can directly obtain depth information. Suppose that 60 frames are output per second as the camera image (60 fps). The display 22 is disposed so as to squarely face eyes of the user. The display 22 displays a VR image generated by the game machine 200. The clock unit 24 outputs time data indicating a present time to the control unit 10.

The control unit 10 performs various kinds of data processing in the HMD 100. The control unit 10 may be implemented by a CPU or a GPU (Graphics Processing Unit) included in the HMD 100 by reading a computer program into a main memory and executing the computer program. For example, the control unit 10 associates sensor data input from the acceleration sensor 16, the angular velocity sensor 18, and the geomagnetic sensor 20 with time data, and transmits the sensor data associated with the time data to the game machine 200. In addition, the control unit 10 associates a camera image input from the camera 140 with time data, and transmits the camera image associated with the time data to the game machine 200. In addition, the control unit 10 displays a VR image transmitted from the game machine 200 on the display 22.

Figure 4:
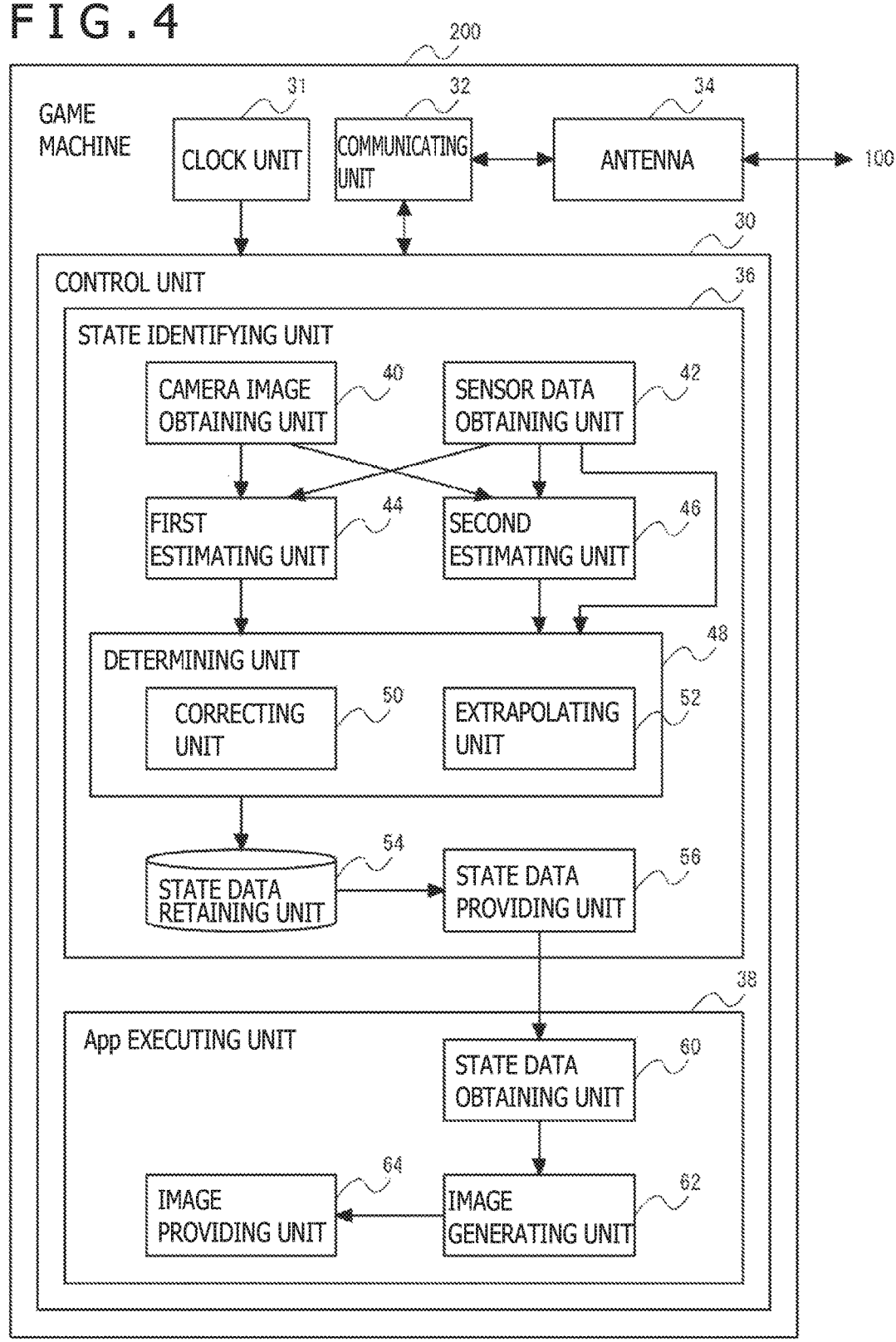
FIG. 4 is a function block diagram depicting a configuration of a game machine.

FIG. 4 is a function block diagram depicting a configuration of the game machine 200. The game machine 200 includes a control unit 30, a clock unit 31, a communicating unit 32, and an antenna 34. The control unit 30 performs various kinds of data processing in the game machine 200. The control unit 30 may be implemented by a CPU or a GPU included in the game machine 200 by reading a computer program into a main memory and executing the computer program. A state data retaining unit 54 depicted within the control unit 30 in FIG. 4 may be implemented by the main memory or a storage of the game machine 200 by storing data.

The clock unit 31 outputs time data indicating a present time to the control unit 30. The communicating unit 32 performs communication processing with an external device via the antenna 34. The control unit 30 transmits and receives various kinds of data to and from the HMD 100 via the communicating unit 32. Incidentally, wire communication may be performed instead of wireless communication. The control unit 30 includes a state identifying unit 36 and an App executing unit 38.

The state identifying unit 36 performs data processing for identifying the state of the HMD 100 including the position and attitude of the HMD 100. The App executing unit 38 executes a game application that uses the state of the HMD 100 which state is identified by the state identifying unit 36. Specifically, the App executing unit 38 generates a VR image corresponding to the position and attitude of the HMD 100. The state identifying unit 36 and the App executing unit 38 may be implemented as a computer program in a same package or computer programs in different packages, and installed on the game machine 200.

The state identifying unit 36 includes a camera image obtaining unit 40, a sensor data obtaining unit 42, a first estimating unit 44, a second estimating unit 46, a determining unit 48, a state data retaining unit 54, and a state data providing unit 56. The camera image obtaining unit 40 obtains a camera image transmitted from the HMD 100. Suppose that the frame rate of the camera image is 60 fps. The sensor data obtaining unit 42 obtains sensor data transmitted from the HMD 100. Specifically, 1000 samples are obtained per second.

The first estimating unit 44 estimates the position and attitude of the HMD 100 by the technique of first SLAM on the basis of the camera image and the sensor data. The first estimating unit 44 retains successively constructed ambient environment information as information for estimating the self-position and attitude. Consequently, in addition to the latest camera image, camera images preceding the latest camera image are referred to. Specifically, the first estimating unit 44 generates an estimation result not including an accumulated error on the basis of the plurality of camera images in the past in addition to the latest camera image.

On the other hand, the first estimating unit 44 takes a relatively long time (45 milliseconds in the embodiment) for one time of estimation processing. The first estimating unit 44 obtains the camera images at a rate of 20 fps from camera images obtained by the camera image obtaining unit 40, and outputs 20 samples per second of information indicating the position and attitude of the HMD 100. That is, estimation processing is performed 20 times per second.

The camera images obtained by the first estimating unit 44 to be used for self-position estimation can be said to be a result of downsampling of a plurality of camera images obtained by the camera image obtaining unit 40 in a temporal direction. In order to increase the accuracy of self-position estimation, the first estimating unit 44 may select a camera image to be used for self-position estimation with the sensor data of a predetermined item as a reference. For example, when sensor data associated with a certain time (that is, associated with time data indicating the certain time) indicates that the angular velocity is lower than a predetermined value, a camera image associated with the time may be used for self-position estimation. In addition, among a predetermined number of (for example, three) camera images obtained by the camera image obtaining unit 40 within a predetermined unit time (for example, 50 milliseconds), a camera image corresponding to a time at which the angular velocity is lowest may be used for self-position estimation.

The second estimating unit 46 estimates the position and attitude of the HMD 100 by the technique of second SLAM on the basis of the camera image and the sensor data. The second estimating unit 46 may estimate a displacement of the attitude on the basis of sensor data of 16 milliseconds (that is, one frame), and perform second SLAM processing on the basis of the estimated value. The second estimating unit 46 also retains successively constructed ambient environment information as information for estimating the self-position and attitude. Consequently, in addition to the latest camera image, camera images preceding the latest camera image are referred to. Specifically, the second estimating unit 46 generates one estimation result in a relative low time (15 milliseconds in the embodiment) on the basis of one camera image in the past in addition to the latest camera image.

Therefore, the second estimating unit 46 obtains the camera images obtained by the camera image obtaining unit 40 without downsampling (that is, at a rate of 60 fps), and outputs 60 samples per second of information indicating the position and attitude of the HMD 100. However, the technique of second SLAM accumulates errors over a plurality of times of estimation processing, and the second estimating unit 46 generates an estimation result including an accumulated error. The first estimating unit 44 and the second estimating unit 46 output the information indicating the position and attitude of the HMD 100 in association with time data associated with the input camera image. That is, the information indicating the position and attitude of the HMD 100 is output in a mode in which the time point of the position and attitude can be identified.

As already described, second SLAM estimates a relative position and attitude (that is, a difference from the past). Suppose that the second estimating unit 46 temporarily retains an estimation result in the past, synthesizes a latest estimation result (difference) with the estimation result in the past, and outputs information indicating an absolute position and attitude as in the case of the first estimating unit 44. Incidentally, the position information output by the first estimating unit 44 and the second estimating unit 46 may be three-dimensional coordinate values in the three-dimensional world coordinate system. In addition, the attitude information output by the first estimating unit 44 and the second estimating unit 46 may be data in quaternion representation or may be data in Eulerian angle representation.

The determining unit 48 generates state data including the position and attitude of the HMD 100 according to the estimation result of the first estimating unit 44, the estimation result of the second estimating unit 46, and the sensor data, and stores the state data in the state data retaining unit 54. This state data includes data indicating the position, attitude, speed, acceleration, angular velocity, and angular acceleration of the HMD 100 at a certain time.

The determining unit 48 includes a correcting unit 50 and an extrapolating unit 52. The correcting unit 50 compares an estimation result of the first estimating unit 44 and an estimation result of the second estimating unit 46 from a same camera image as a source with each other, and corrects an estimation result generated by the second estimating unit 46 after the estimation result of the second estimating unit 46 which estimation result is used in the comparison on the basis of a result of the comparison. Suppose in the following that a difference between the estimation result of the first estimating unit 44 and the estimation result of the second estimating unit 46 is obtained. However, the difference may not necessarily be obtained. For example, generation times, output times, associated time data, or the like of the estimation result of the first estimating unit 44 and the estimation result of the second estimating unit 46 may be compared with each other.

The correcting unit 50 in the embodiment obtains a difference between an estimation result of the first estimating unit 44 and an estimation result of the second estimating unit 46 which estimation results are associated with same time data, and corrects, on the basis of the difference, an estimation result generated by the second estimating unit 46 after the estimation result of the second estimating unit 46 from which estimation result the difference is obtained. The estimation result to be corrected here can also be said to be an estimation result generated by the second estimating unit 46 with a newly imaged camera image as a source. The correcting unit 50 determines a value after the correction of the estimation result of the second estimating unit 46 as a final value of the position and attitude of the HMD 100 at a time point indicated by the time data associated in advance, and stores the final value in the state data retaining unit 54 together with the time data.

The difference between the estimation result of the first estimating unit 44 and the estimation result of the second estimating unit 46 includes at least one of a deviation between coordinate values indicating the position of the HMD 100 and a deviation between quaternion values indicating the attitude of the HMD 100. The correcting unit 50 corrects the subsequent estimation result of the second estimating unit 46, the subsequent estimation result being subsequent to the estimation result of the second estimating unit 46 from which estimation result the difference is obtained, so as to resolve the difference between the estimation result of the first estimating unit 44 and the estimation result of the second estimating unit 46. For example, when the correcting unit 50 detects a difference between an estimation result of the first estimating unit 44 and an estimation result of the second estimating unit 46 on the basis of a camera image imaged at a first time point, the correcting unit 50 changes an estimation result of the second estimating unit 46 which estimation result is based on a camera image imaged at a second time point subsequent to the first time point so as to resolve the previously detected difference.

When the correcting unit 50 detects the difference between the estimation result of the first estimating unit 44 and the estimation result of the second estimating unit 46, the correcting unit 50 may perform correction processing on one estimation result of the second estimating unit 46 so as to resolve all of the difference. In other words, all of the detected difference may be resolved in one time of correction processing. In that case, however, when the difference between the estimation result of the first estimating unit 44 and the estimation result of the second estimating unit 46 is large, an amount of correction in one correction is also increased, so that a skip or jerkiness may occur in the display of the VR image in the HMD 100. Accordingly, the correcting unit 50 according to the embodiment suppresses the occurrence of the skip or jerkiness in the display of the VR image by performing correction processing so as to resolve the detected difference gradually.

Specifically, the second estimating unit 46 performs a plurality of times (for example, three times) of estimation processing based on a plurality of camera images during one time of estimation processing by the first estimating unit 44. In a period from the obtainment of a difference between an estimation result of the first estimating unit 44 and an estimation result of the second estimating unit 46 to the input of a next estimation result of the first estimating unit 44, the correcting unit 50 corrects each of a plurality of subsequent estimation results of the second estimating unit 46, the subsequent estimation results being subsequent to the estimation result of the second estimating unit 46 from which estimation result the difference is obtained, so as to resolve the difference gradually. A concrete example thereof will be described later with reference to FIG. 9.

On the basis of the final value (60 samples per second) of the position and attitude of the HMD 100 at a specific time which final value is generated by the correcting unit 50, the extrapolating unit 52 extrapolates a value of the position and attitude of the HMD 100 at other than the specific time. Other than the specific time includes a future time. Specifically, the extrapolating unit 52 predicts the value of the position and attitude of the HMD 100 at other than the specific time on the basis of 60 samples per second of the final value of the position and attitude of the HMD 100 and sensor data at each time (1000 samples per second). For example, the value of the position and attitude of the HMD 100 at other than the specific time may be predicted according to a displacement direction of the position or attitude of the HMD 100 which displacement direction is indicated by sensor data, and the predicted value may be stored in the state data retaining unit 54 in association with each time.

The determining unit 48 stores the sensor data obtained by the sensor data obtaining unit 42 in the state data retaining unit 54 as it is in association with time data. Speed may be obtained by integrating acceleration. Angular acceleration may be obtained by differentiating angular velocity. As a result of the above, the state data retaining unit 54 stores state data indicating the position, attitude, speed, acceleration, angular velocity, and angular acceleration of the HMD 100 at each of times ranging from the past through the present time to the future. Though depending on the speed of extrapolation processing in the extrapolating unit 52, for example, 120 samples per second of state data indicating the position and attitude of the HMD 100 may be retained, and 1000 samples per second of state data indicating the speed, acceleration, angular velocity, and angular acceleration of the HMD 100 may be retained.

The state data providing unit 56 receives, from the App executing unit 38, a state data providing request specifying a condition (typically time) of state data necessary for VR image generation processing by a game application. The state data providing unit 56 identifies state data matching the condition specified by the state data providing request or closest to the condition, and transmits the identified state data to the App executing unit 38.

The App executing unit 38 includes a state data obtaining unit 60, an image generating unit 62, and an image providing unit 64. When state data of the HMD 100 becomes necessary in VR image generation processing by the game application, the state data obtaining unit 60 identifies a condition of the necessary state data. This condition may, for example, be a future time indicating 100 milliseconds hence. The state data obtaining unit 60 transmits a state data providing request specifying the condition to the state identifying unit 36, and obtains state data matching the condition from the state identifying unit 36.

The image generating unit 62 generates screen data of the game application according to the state data obtained by the state data obtaining unit 60. This screen data is typically a VR image reflecting the position and attitude of the HMD 100. The screen data is, for example, the video of a virtual space to be presented to a field of view of the user wearing the HMD 100. The image providing unit 64 transmits the VR image generated by the image generating unit 62 to the HMD 100 to make the VR image displayed on the display 22 of the HMD 100.

Operation of the information processing system 210 having the above configuration will be described.

Figure 5:
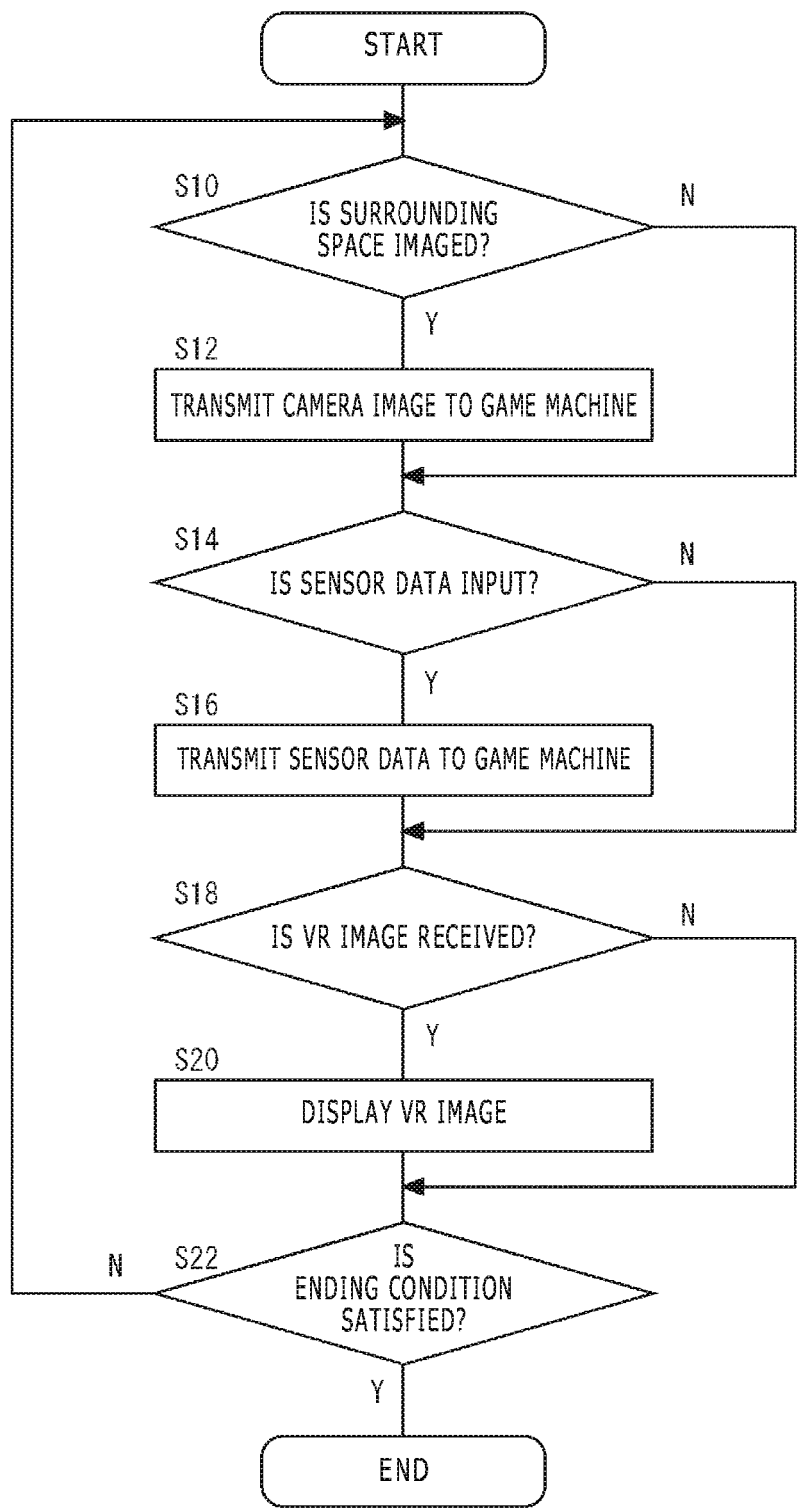
FIG. 5 is a flowchart depicting operation of the HMD.

FIG. 5 is a flowchart depicting operation of the HMD 100. Each time the camera 140 images a three-dimensional real space extending around the periphery of the HMD 100 at a predetermined rate (Y in S10), the control unit 10 transmits the image of the space surrounding the HMD 100 to the game machine 200 (S12). When the imaging processing of the camera 140 is not yet performed (N in S10), S12 is skipped. Each time sensor data on acceleration and the like is input from the various sensors included in the HMD 100 (Y in S14), the control unit 10 transmits the input sensor data to the game machine 200 (S16). When the sensor data is not yet input (N in S14), S16 is skipped.

When the control unit 10 receives a VR image transmitted from the game machine 200 via the communicating unit 12 (Y in S18), the control unit 10 displays the VR image on the display 22 (S20). When no VR image is received yet (N in S18), S20 is skipped. When a predetermined ending condition is satisfied, for example, when a predetermined operation indicating an end of the VR image display is input or when a command indicating the end is received from the game machine 200 (Y in S22), the flow of the present drawing is ended. When the ending condition is not yet satisfied (N in S22), the processing returns to S10.

Figure 6:
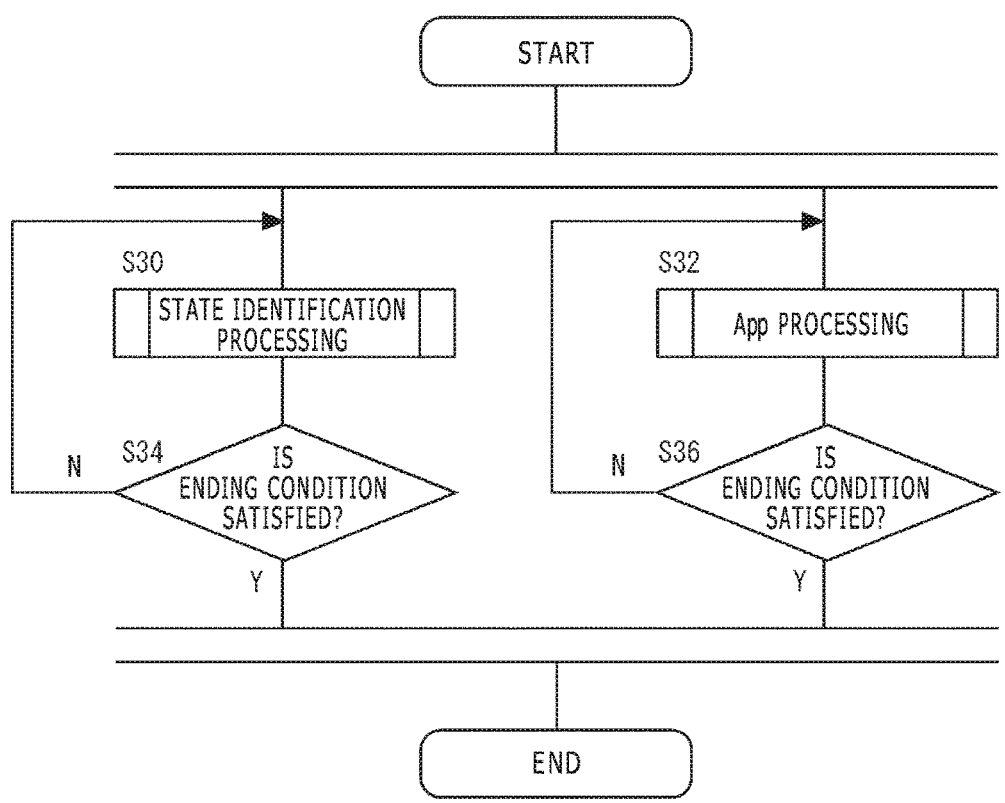
FIG. 6 is a flowchart depicting operation of the game machine.

FIG. 6 is a flowchart depicting operation of the game machine 200. The game machine 200 performs data processing including self-position estimation by the state identifying unit 36 and data processing of the game application by the App executing unit 38 in parallel with each other (S30) (S32). When a predetermined ending condition is satisfied, for example, when an ending operation is input from the user (Y in S34) (Y in S36), the flow of the present drawing is ended. When the ending condition is not yet satisfied (N in S34) (N in S36), S30 and S32 are repeated.

Figure 7:
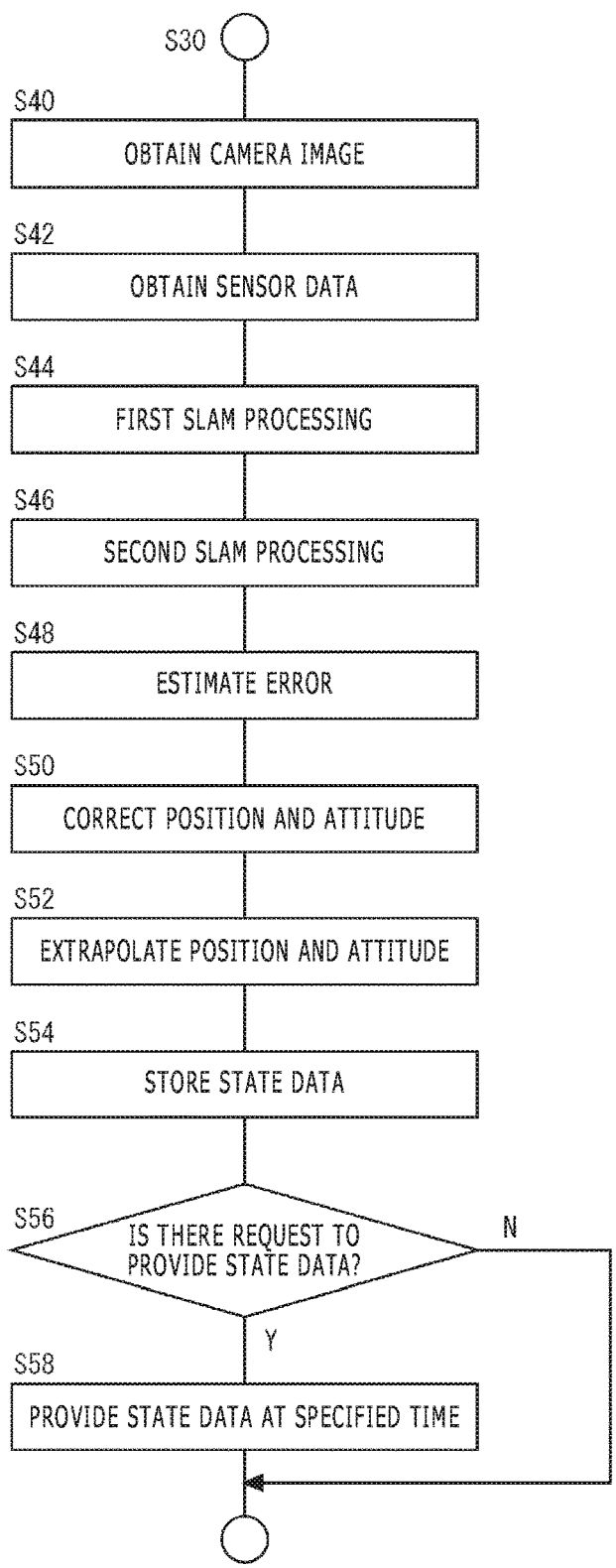
FIG. 7 is a flowchart depicting in detail state identification processing of S30 in FIG. 6.

FIG. 7 is a flowchart depicting in detail the state identification processing of S30 in FIG. 6. The camera image obtaining unit 40 obtains a camera image provided from the HMD 100 (S40). The sensor data obtaining unit 42 obtains sensor data provided from the HMD 100 (S42). The first estimating unit 44 and the second estimating unit 46 respectively perform self-position estimation processing by first SLAM and self-position estimation processing by second SLAM in parallel with each other (S44) (S46). The correcting unit 50 estimates an error between an estimation result of the first estimating unit 44 and an estimation result of the second estimating unit 46 (S48), and corrects an estimation result of the second estimating unit 46 so as to resolve the error (S50).

The extrapolating unit 52 predicts the movement of the HMD 100 on the basis of the sensor data obtained in S42, and extrapolates data on the position and attitude of the HMD 100 (S52). The determining unit 48 stores, in the state data retaining unit 54, state data indicating the position and attitude of the HMD 100 at each time, the state data being determined in S50 and S52, and state data indicating the speed, acceleration, angular velocity, and angular acceleration of the HMD 100 at each time, the state data being obtained in S42 (S54). When the state data providing unit 56 receives a state data providing request from the App executing unit 38 (Y in S56), the state data providing unit 56 provides the App executing unit 38 with state data corresponding to a time specified in the request (S58). When no state data providing request is received (N in S56), S58 is skipped.

Figure 8:
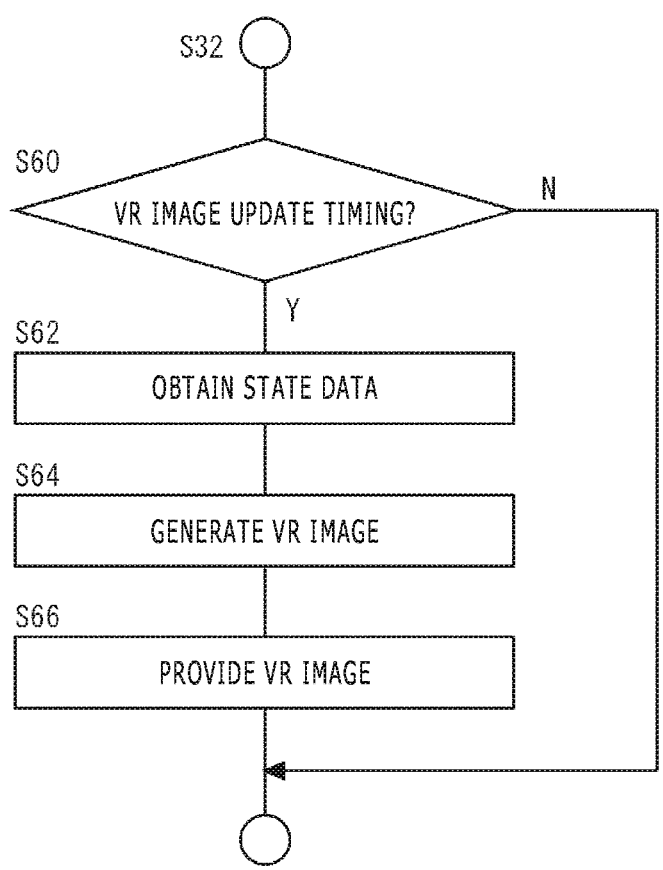
FIG. 8 is a flowchart depicting in detail App (Application) processing of S32 in FIG. 6.

FIG. 8 is a flowchart depicting in detail the App processing of S32 in FIG. 6. When detecting that VR image update timing is reached on the basis of a predetermined refresh rate or the like (Y in S60), the state data obtaining unit 60 obtains state data matching a condition (time of a rendering object or the like) of a VR image to be rendered from the state identifying unit 36 (S62). The image generating unit 62 generates a VR image matching the position and attitude of the HMD 100 at the rendering object time on the basis of the state data obtained in S62 (S64). The image providing unit 64 transmits the VR image generated in S64 to the HMD 100 to present the VR image to the user (S66). When VR image update timing is not reached (N in S60), processing from S62 on down is skipped.

Figure 9:
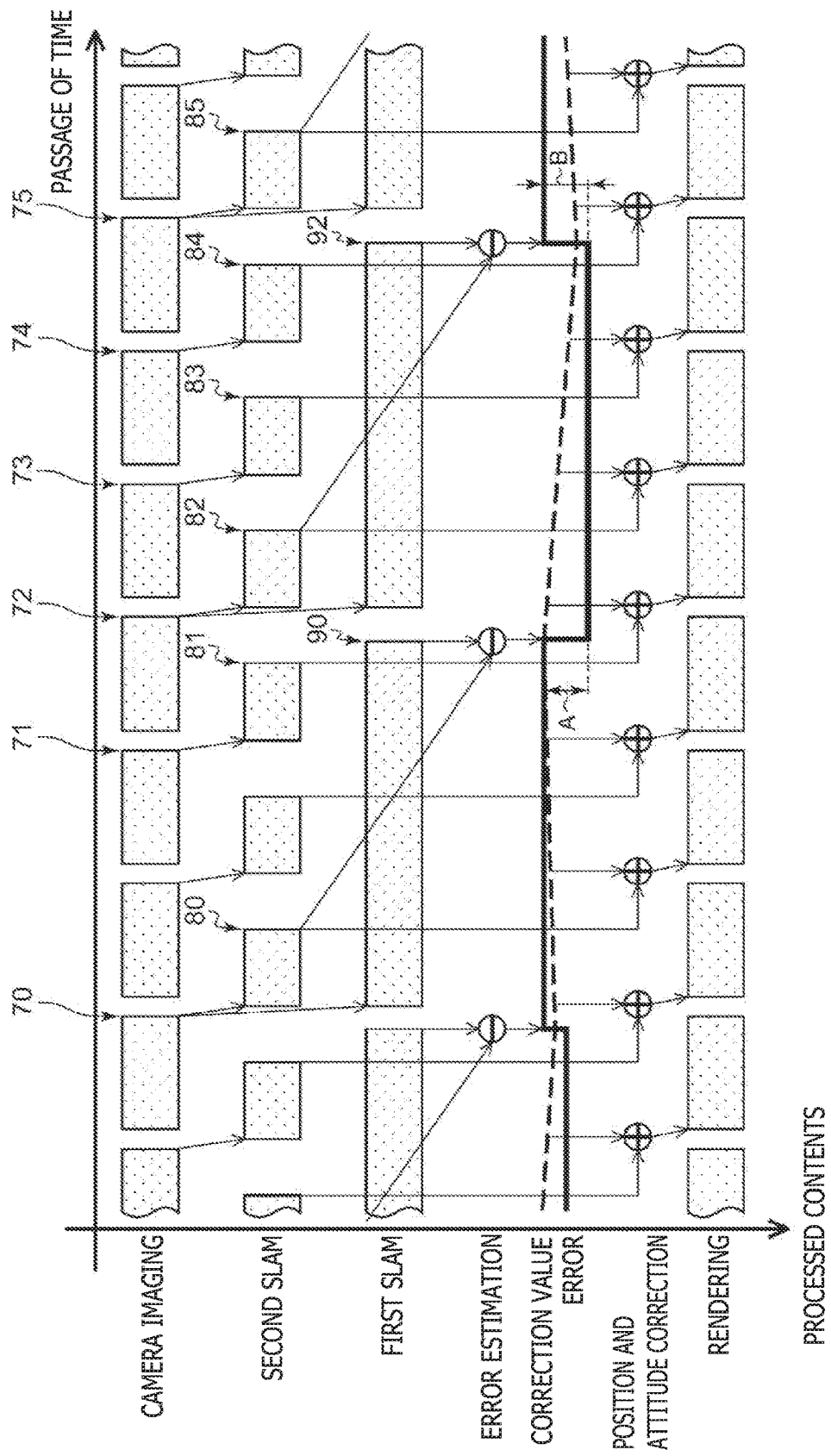
FIG. 9 is a diagram depicting processing up to VR (Virtual Reality) image generation in time series.

FIG. 9 depicts processing up to VR image generation in time series. In the figure, the execution time of each piece of processing is depicted on a time line, and reference numerals denote data generated in each piece of processing. Three times of estimation processing are performed by the second estimating unit 46 while one time of estimation processing is performed by the first estimating unit 44. Incidentally, first SLAM (first estimating unit 44) and second SLAM (second estimating unit 46) both retain successively constructed ambient environment information as information for estimating the self-position. Hence, in addition to camera images associated by arrows, older camera images are practically referred to.

The correcting unit 50 estimates an error between a second SLAM estimation result 80 and a first SLAM estimation result 90 based on a camera image 70 as a same source. Suppose here that an error "A" is estimated. In FIG. 9, changes in correction value based on the error are indicated by a broken line. The correcting unit 50 corrects each of results including a second SLAM estimation result 81 based on a camera image 71, a second SLAM estimation result 82 based on a camera image 72, and a second SLAM estimation result 83 based on a camera image 73, the second SLAM estimation results 81, 82, and 83 being subsequent to the second SLAM estimation result 80 as an error estimation object, so as to resolve the error "A" gradually.

For example, the error may be divided on the basis of a difference between a time required for first SLAM and a time required for second SLAM, and a value after the division may be applied over a plurality of times of correction processing. In the example of FIG. 9, three times of correction processing are performed before the input of a first SLAM estimation result 92. Therefore, (A/3) may be set as an adjustment value, and each time of correction processing may equally correct the second SLAM estimation result by (A/3).

The correcting unit 50 further estimates an error between the second SLAM estimation result 82 and the first SLAM estimation result 92 based on the camera image 72. Suppose here that an error "B" is estimated. The correcting unit 50 corrects each of results including a second SLAM estimation result 84 based on a camera image 74 and a second SLAM estimation result 85 based on a camera image 75, the second SLAM estimation results 84 and 85 being subsequent to the second SLAM estimation result 82 as an error estimation object, so as to resolve the error "B" gradually.

According to the information processing system 210 in accordance with the embodiment, first SLAM that has a low speed but generates an estimation result not including an accumulated error and second SLAM that has a high speed but generates an estimation result including an accumulated error are used in combination with each other, and the weaknesses of first SLAM and second SLAM are mutually complemented. Thereby both quickness and accuracy of self-position estimation can be achieved. In addition, it is possible to implement a head-mounted display system that can provide a VR image accurately reflecting the position and attitude of the HMD 100 (in other words, the user wearing the HMD 100) at high speed. Thus, the ability of the VR image presented by the HMD 100 to follow the movement of the head of the user can be improved, so that feeling of sickness by the user can be suppressed.

In addition, because a common camera image is input to both first SLAM and second SLAM, the information processing system 210 according to the embodiment can be implemented using one camera. The cost of the HMD 100 can therefore be reduced. In addition, a plurality of estimation results of second SLAM are corrected so as to gradually resolve a difference between an estimation result of first SLAM and an estimation result of second SLAM. Consequently, large changes in the position and attitude of the HMD 100 before or after one time of correction can be suppressed, so that smooth changes in the VR image can be realized. In addition, it is possible to suppress causing a feeling of strangeness to the user.

The present invention has been described above on the basis of an embodiment thereof. The embodiment is illustrative, and it is to be understood by those skilled in the art that combinations of constituent elements and processing processes of the embodiment are susceptible of various modifications and that such modifications also fall within the scope of the present invention. Modifications will be illustrated in the following. In description of each modification, same or corresponding members are identified by the same reference numerals. Description overlapping that of the embodiment and description overlapping between modifications will be omitted as appropriate.

A first modification will be described. Functions assigned to the HMD 100 (FIG. 3) and the game machine 200 (FIG. 4) depicted in the embodiment are an example. For example, a configuration may be adopted in which at least part of the functional blocks of the game machine 200 depicted in FIG. 4 are provided on the HMD 100 side. In addition, in a case where sufficient hardware resources can be included in the HMD 100, the functions of the state identifying unit 36 and the App executing unit 38 in FIG. 4 may be performed by the control unit of the HMD 100.

A second modification will be described. The first estimating unit 44 may estimate at least one of the position and attitude of the HMD 100 on the basis of a camera image of relatively high image quality, and the second estimating unit 46 may estimate at least one of the position and attitude of the HMD 100 on the basis of a camera image of relatively low image quality. For example, a configuration may be adopted in which the HMD 100 is provided with a first camera that outputs an imaged image of HD (High Definition) image quality (high resolution) and a second camera that outputs an imaged image of VGA (Video Graphics Array) image quality (low resolution), the first estimating unit 44 analyzes the output image of the first camera, and the second estimating unit 46 analyzes the output image of the second camera.

In addition, as in the embodiment, one camera may be provided, and the camera may output an imaged image of HD image quality (high resolution) at a rate of 60 fps. In this case, the camera image obtaining unit 40 of the game machine 200 may input a camera image (20 fps and HD image quality) obtained by downsampling the imaged image of the camera 140 in a temporal direction to the first estimating unit 44. In addition, the camera image obtaining unit 40 may input a camera image (60 fps and VGA image quality) obtained by downsampling the imaged image of the camera 140 in a spatial direction to the second estimating unit 46.

According to the second modification, it is possible to achieve accurate self-position estimation by inputting a camera image of high image quality to the first estimating unit 44. In addition, it is possible to reduce a load of image analysis and achieve high-speed self-position estimation by inputting a camera image of low image quality to the second estimating unit 46. In addition, even with one camera, camera images of suitable image qualities can be input to the first estimating unit 44 and the second estimating unit 46.

Figure 10:
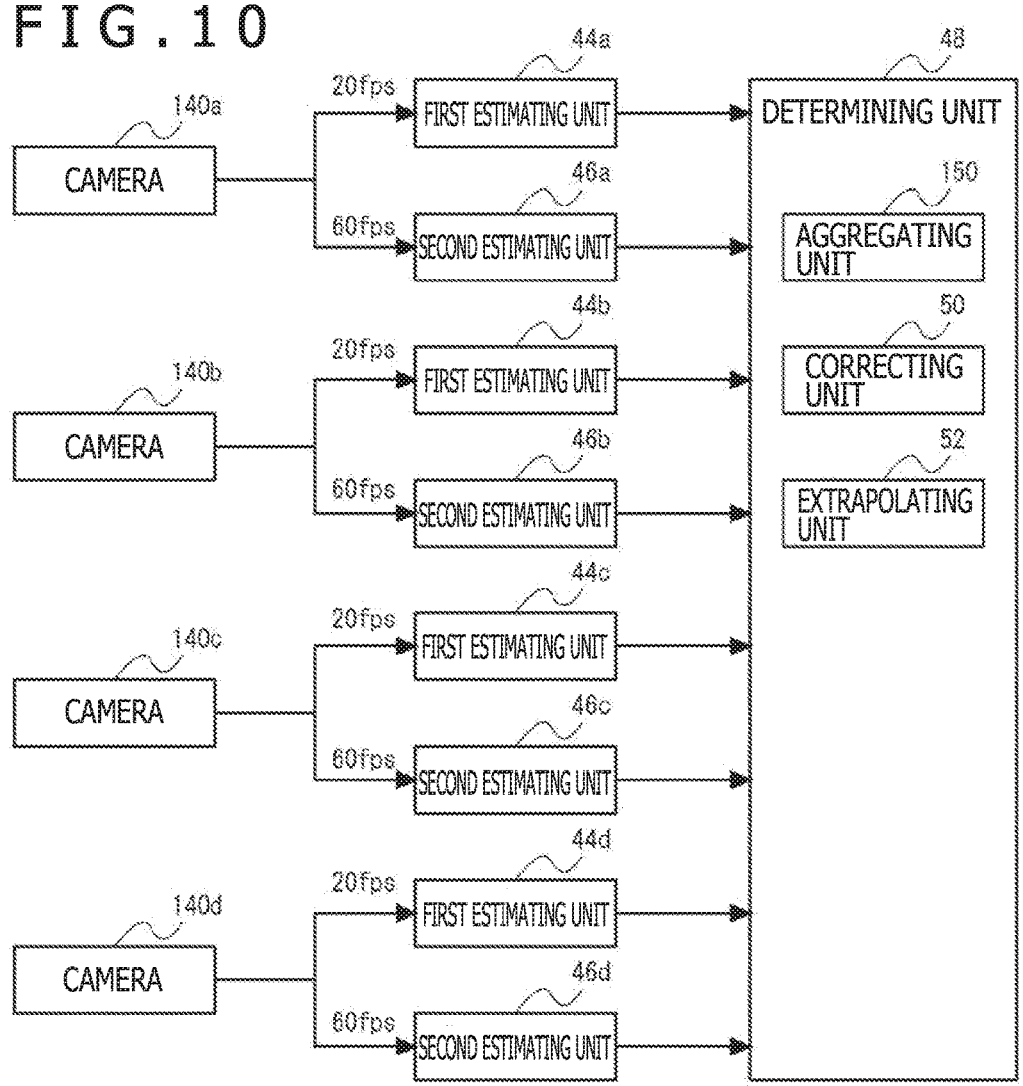
FIG. 10 is a diagram schematically depicting a system according to a third modification.

A third modification will be described. FIG. 10 schematically depicts a system according to a third modification. The HMD 100 according to the third modification includes a plurality of cameras. The plurality of cameras image a real space in respective different directions as viewed from the HMD 100. A camera 140a, a camera 140b, a camera 140c, and a camera 140d in FIG. 10 respectively image a front space (for example, a sight line direction of the user), a rear space, a left space, and a right space of the HMD 100. The game machine 200 includes a plurality of first estimating units (a first estimating unit 44a, a first estimating unit 44b, a first estimating unit 44c, and a first estimating unit 44d), and also includes a plurality of second estimating units (a second estimating unit 46a, a second estimating unit 46b, a second estimating unit 46c, and a second estimating unit 46d). These units may be implemented as a plurality of processes or threads, and functions of these units may be performed in a distributed manner by a plurality of CPUs or GPUs.

The plurality of first estimating units and the plurality of second estimating units each perform self-position estimation processing independently of each other on the basis of images imaged by the cameras associated in advance. The game machine 200 further includes an aggregating unit 150. The aggregating unit 150 generates one estimation result by aggregating (in other words, synthesizing) respective estimation results of the plurality of first estimating units. In addition, one estimation result is generated by aggregating respective estimation results of the plurality of second estimating units. Incidentally, the estimation results associated with same time data are aggregated. Subsequent correction processing is similar to that of the embodiment. According to the third modification, the accuracy of self-position estimation can be increased on the basis of the images imaged by the plurality of cameras.

Examples of aggregating the estimation results of the plurality of first estimating units will be described. The estimation results of the plurality of second estimating units are also aggregated in similar manners. (1) The aggregating unit 150 may determine an average value of the estimation results of the plurality of respective first estimating units as a definite estimation result of the first estimating units. (2) Reliability of position estimation in a depth direction is relatively low. Accordingly, the aggregating unit 150 may not use positions in the depth direction in the estimation results of the plurality of first estimating units, but may generate a three-dimensional position (three-dimensional coordinate value) by combining vertical and horizontal positions (two-dimensional coordinate values) in the respective estimation results.

(3) A camera image having a larger feature quantity results in higher reliability of position estimation. For example, the more various the objects appearing in the camera image, the higher the reliability of position estimation. Accordingly, the aggregating unit 150 may receive the magnitude of a feature quantity or the number of feature points detected from an input camera image from each first estimating unit, and adopt an estimation result based on a camera image having a larger feature quantity (larger number of feature points) more preferentially than another estimation result. For example, an estimation result based on a camera image having a largest feature quantity may be determined as a definite estimation result of the first estimating units. In addition, weights may be set on the basis of the magnitude of the feature quantities, and a weighted mean value of the estimation results may be calculated.

Figure 11:
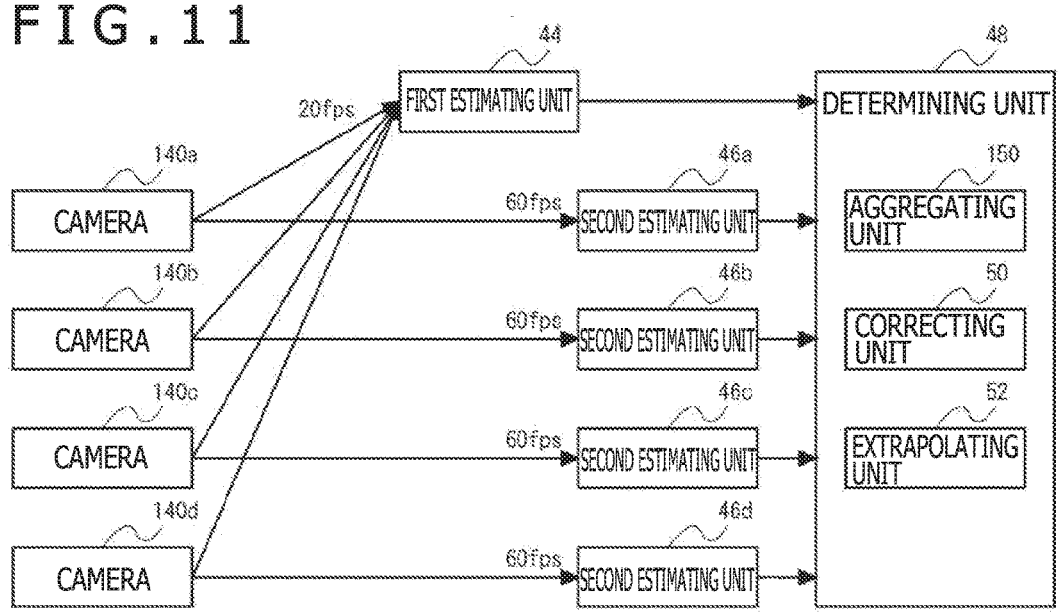
FIG. 11 is a diagram schematically depicting a system according to a fourth modification.

A fourth modification will be described. FIG. 11 schematically depicts a system according to the fourth modification. As in the third modification, the HMD 100 according to the fourth modification includes a plurality of cameras (a camera 140a, a camera 140b, a camera 140c, and a camera 140d) imaging a real space in directions different from each other. The game machine 200 includes one first estimating unit 44 and a plurality of second estimating units (a second estimating unit 46a, a second estimating unit 46b, a second estimating unit 46c, and a second estimating unit 46d). Camera images each imaged by the plurality of cameras are input to the first estimating unit 44 at a rate of 20 fps. Meanwhile, the camera images imaged by the corresponding cameras are each input to the plurality of second estimating units at a rate of 60 fps.

Self-position estimation by the first estimating unit 44 is desired to provide an estimation result not including an accumulated error while allowed to take time, or in other words, is desired to provide an estimation result having a relatively high accuracy in a long period. Therefore, as an image input to the first estimating unit 44, an image having a large amount of information is preferable, and an image having a small deviation from reality is preferable. For example, the image input to the first estimating unit 44 may be a panoramic image obtained by synthesizing the images imaged by the plurality of respective cameras. In addition, the image input to the first estimating unit 44 may be an image (for example, an omnidirectional image) that is obtained by synthesizing the images imaged by the plurality of respective cameras and which depicts a state in all directions of 360 degrees of the periphery of the HMD 100. Further, the image input to the first estimating unit 44 may be an image whose accuracy is improved by calibration. The HMD 100 or the game machine 200 may include a camera image adjusting unit (not depicted) that synthesizes the images imaged by the plurality of respective cameras and/or performs calibration.

On the other hand, self-position estimation by the second estimating unit 46 is allowed to provide an estimation result including an accumulated error, or in other words, is desired to have quickness while allowed to provide an estimation result having a relatively low accuracy in a long period. Hence, for the image input to the second estimating unit 46, a high rate is more desired than an amount of information or accuracy. Accordingly, in the fourth modification, the images imaged by the plurality of respective cameras are input to the second estimating unit 46 as they are without an adjustment such as synthesis, calibration, or the like being performed. As in the third modification, the aggregating unit 150 aggregates estimation results of the plurality of second estimating units. According to the fourth modification, in addition to an improvement in accuracy of self-position estimation due to the provision of a plurality of cameras, the accuracy of self-position estimation by the first estimating unit 44 can be further increased by inputting an image having a large amount of information and a high accuracy to the first estimating unit 44.

Figure 12:
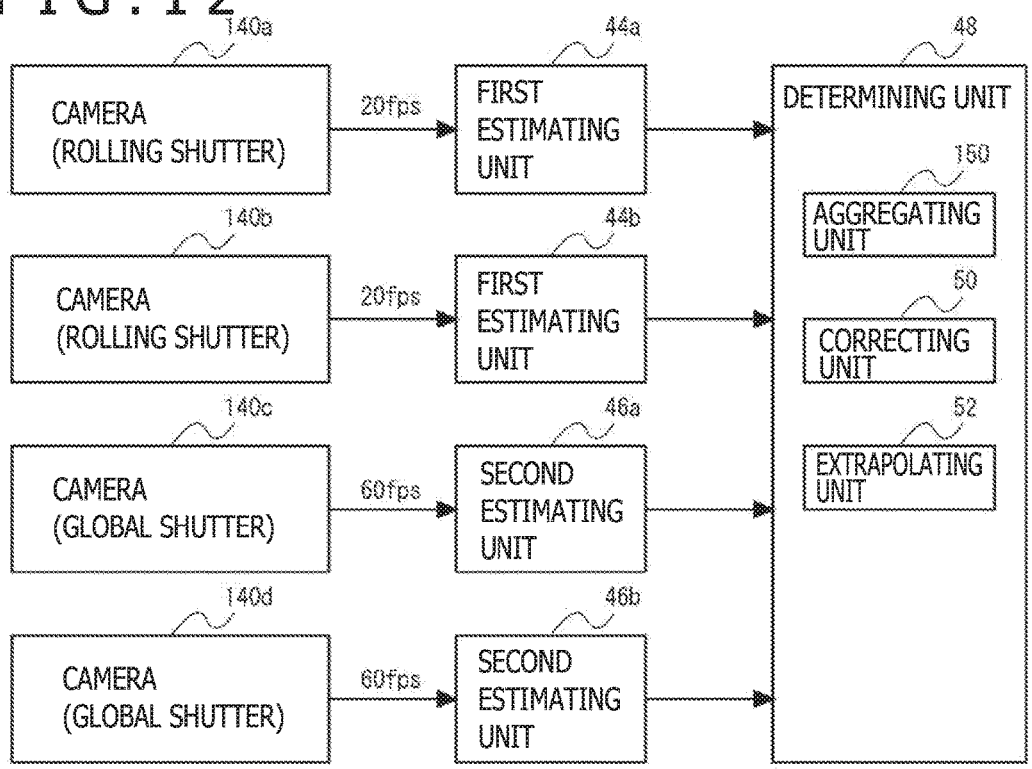
FIG. 12 is a diagram schematically depicting a system according to a fifth modification.

A fifth modification will be described. FIG. 12 schematically depicts a system according to the fifth modification. The HMD 100 according to the fifth modification includes a plurality of cameras (a camera 140*a* and a camera 140*b*) of a rolling shutter type (using a CMOS image sensor, for example). The HMD 100 also includes a plurality of cameras (a camera 140*c* and a camera 140*d*) of a global shutter type (using a CCD image sensor, for example). The camera 140*a* and the camera 140*c* may image a space in front of the HMD 100. The camera 140*b* and the camera 140*d* may image a space in the rear of the HMD 100.

In images imaged by the camera 140*a* and the camera 140*b*, an object moving at a high speed or the like may be distorted. The HMD 100 or the game machine 200 therefore further includes a camera image correcting unit (not depicted) for correcting the images imaged by the camera 140*a* and the camera 140*b*. A first estimating unit 44*a* and a first estimating unit 44*b* perform self-position estimation on the basis of the camera images corrected by the camera image correcting unit. No distortion occurs in the images imaged by the camera 140*c* and the camera 140*d*. Thus, the second estimating unit 46*a* and the second estimating unit 46*b* perform self-position estimation using the images imaged by the camera 140*c* and the camera 140*d* as they are.

The second estimating units desired to perform high-speed self-position estimation need to be supplied with the camera images at a high rate. Thus, cameras of the global shutter type are preferably used. On the other hand, self-position estimation by the first estimating units takes a relatively long time. Therefore, the input rate of the camera images for the first estimating units may be low, and a correction time for the images imaged by the cameras can be secured. Hence, the manufacturing cost of the HMD 100 can be reduced by using cameras of the rolling shutter type as cameras for imaging images to be input to the first estimating units.

In addition, as already described in the second modification, images of relatively high image quality (for example, HD image quality) may be input to the first estimating units desired to have accuracy, and images of relatively low image quality (for example, VGA image quality) may be input to the second estimating units desired to have quickness. The configuration of the fifth modification is suitable in this case. This is because provision for high resolution is not easily made in cameras of the global shutter type, whereas provision for high resolution is easily made in cameras of the rolling shutter type. According to the fifth modification, self-position estimation excellent in speed, accuracy, and cost can be realized on the basis of differences between characteristics of the first estimating unit 44 and the second estimating unit 46 and differences between characteristics of the rolling shutter type and the global shutter type.

Figure 13:
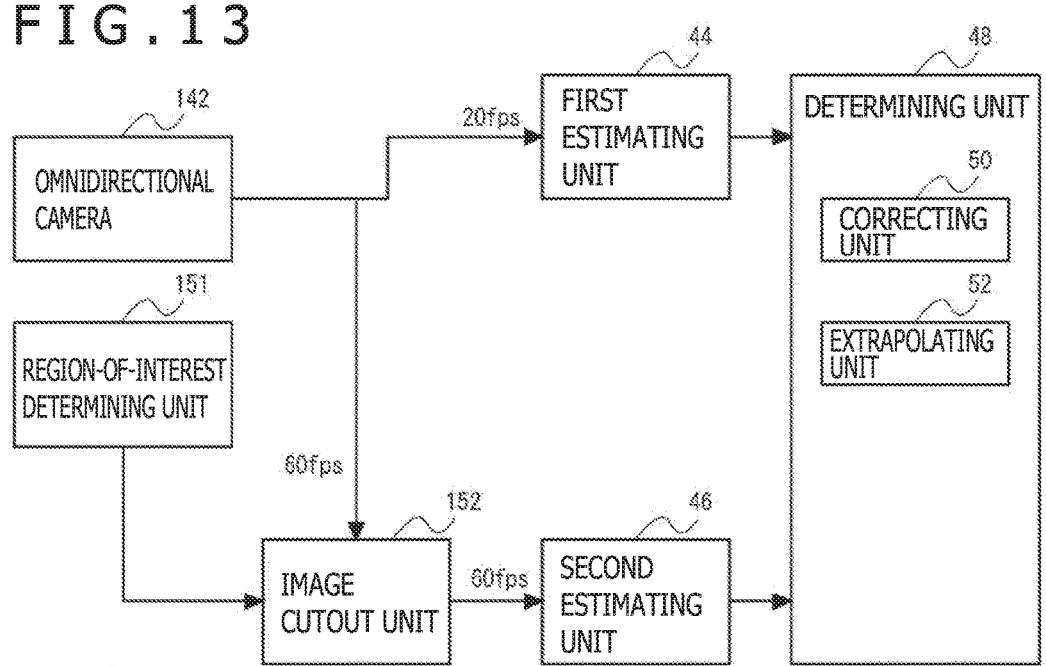
FIG. 13 is a diagram schematically depicting a system according to a sixth modification.

A sixth modification will be described. FIG. 13 schematically depicts a system according to the sixth modification. The HMD 100 according to the sixth modification includes an omnidirectional camera 142. A wide angle camera may be provided in place of the omnidirectional camera 142. The omnidirectional camera 142 generates a panoramic image by imaging a wide range using a fisheye lens or the like. In the sixth modification, an omnidirectional image, which is an image depicting a state in all directions of 360 degrees of the periphery of the HMD 100, is generated. The HMD 100 or the game machine 200 further includes a region-of-interest determining unit 151 and an image cutout unit 152.

The region-of-interest determining unit 151 generates region-of-interest information for cutting out an image to be input to the second estimating unit 46 from the omnidirectional image. The region-of-interest information may be, for example, information indicating a direction of attention of a user, or in other words, a sight line direction of the user. A sensor that detects the sight line direction of the user may be further provided to the HMD 100. In addition, when a predetermined region (for example, a central part) of the omnidirectional image is set in advance to depict a space in front of the HMD 100, the region-of-interest information may be information indicating the predetermined region (for example, the central part of the omnidirectional image). In addition, the region-of-interest determining unit 151 may count a feature quantity (for example, the number of objects) for self-position estimation in each region of the omnidirectional image, and set a region whose feature quantity is relatively large as a region of interest. This is because the accuracy of self-position estimation is thereby improved.

The image cutout unit 152 generates a region-of-interest image according to the region-of-interest information determined by the region-of-interest determining unit 151, the region-of-interest image being part of the omnidirectional image input to the first estimating unit 44 and being an image obtained by cutting out a region of interest from the omnidirectional image. The first estimating unit 44 performs self-position estimation on the basis of the omnidirectional image output from the omnidirectional camera 142. As in the embodiment, omnidirectional images as an object of analysis may be selected at a rate of 20 fps on the basis of sensor data or the like from omnidirectional images input at a rate of 60 fps. The second estimating unit 46 performs self-position estimation on the basis of the region-of-interest image generated by the image cutout unit 152.

According to the configuration of the sixth modification, the accuracy of self-position estimation by the first estimating unit 44 can be increased by inputting the omnidirectional image having a large amount of information to the first estimating unit 44. The analysis of the omnidirectional image takes time. However, because accuracy is more desired than quickness in the first estimating unit 44, the input of the omnidirectional image is suitable for the first estimating unit 44. Meanwhile, quick self-position estimation by the second estimating unit 46 can be maintained by inputting the region-of-interest image having a small amount of information to the second estimating unit 46. However, because the region-of-interest image is a source for the self-position estimation, a decrease in accuracy of the self-position estimation by the second estimating unit 46 can be suppressed.

Figure 14:
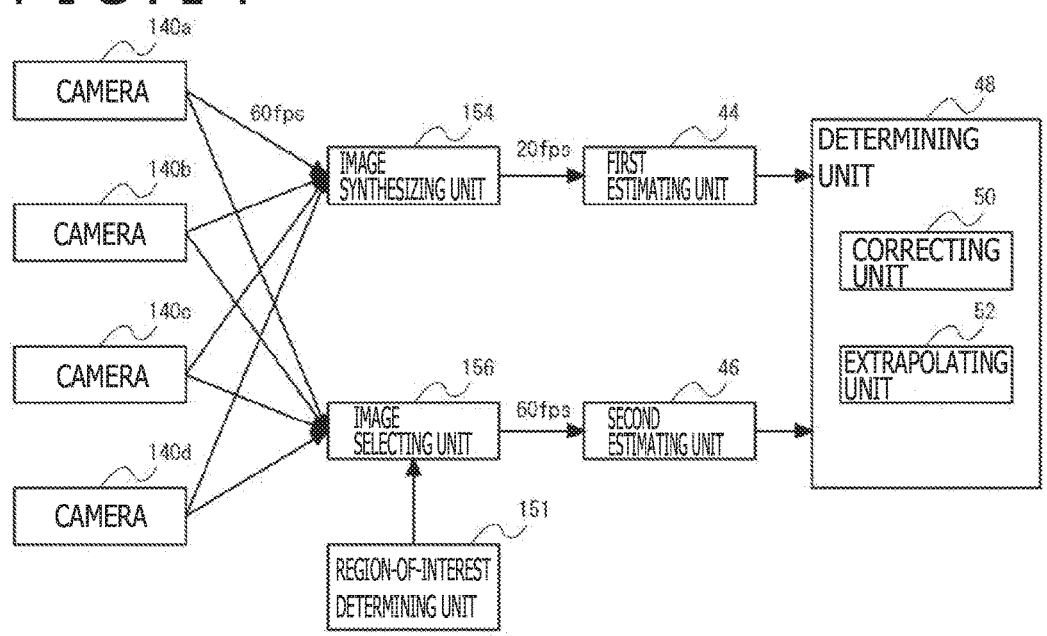
FIG. 14 is a diagram schematically depicting a system according to a seventh modification.

A seventh modification will be described. FIG. 14 schematically depicts a system according to the seventh modification. The HMD 100 according to the seventh modification includes a plurality of cameras (a camera 140a, a camera 140b, a camera 140c, and a camera 140d) imaging a real space in directions different from each other. The HMD 100 or the game machine 200 further includes a region-of-interest determining unit 151, an image synthesizing unit 154, and an image selecting unit 156.

The image synthesizing unit 154 generates a panoramic image (for example, an omnidirectional image) by synthesizing images imaged by the plurality of respective cameras. The region-of-interest determining unit 151 determines a region of interest as in the sixth modification. The image selecting unit 156 selects an imaged image corresponding to the region of interest determined by the region-of-interest determining unit 151 as a region-of-interest image from among the images imaged by the plurality of respective cameras. For example, when the region of interest is the front of the HMD 100, an image imaged by a particular camera imaging a space in front of the HMD 100 is selected as the region-of-interest image.

The first estimating unit 44 performs self-position estimation on the basis of the panoramic image generated by the image synthesizing unit 154. The second estimating unit 46 performs self-position estimation on the basis of the region-of-interest image selected by the image selecting unit 156. The configuration of the seventh modification produces effects similar to those of the sixth modification.

An eighth modification will be described. The second estimating unit 46 performs a plurality of times of estimation processing based on a plurality of camera images during one time of estimation processing by the first estimating unit 44. The first estimating unit 44 performs the plurality of times of estimation processing based on the plurality of camera images in parallel with each other. When an estimation result is output by each of the pieces of parallel estimation processing by the first estimating unit 44, the correcting unit 50 updates a difference between the estimation result and an estimation result of the second estimating unit 46.

Figure 15:
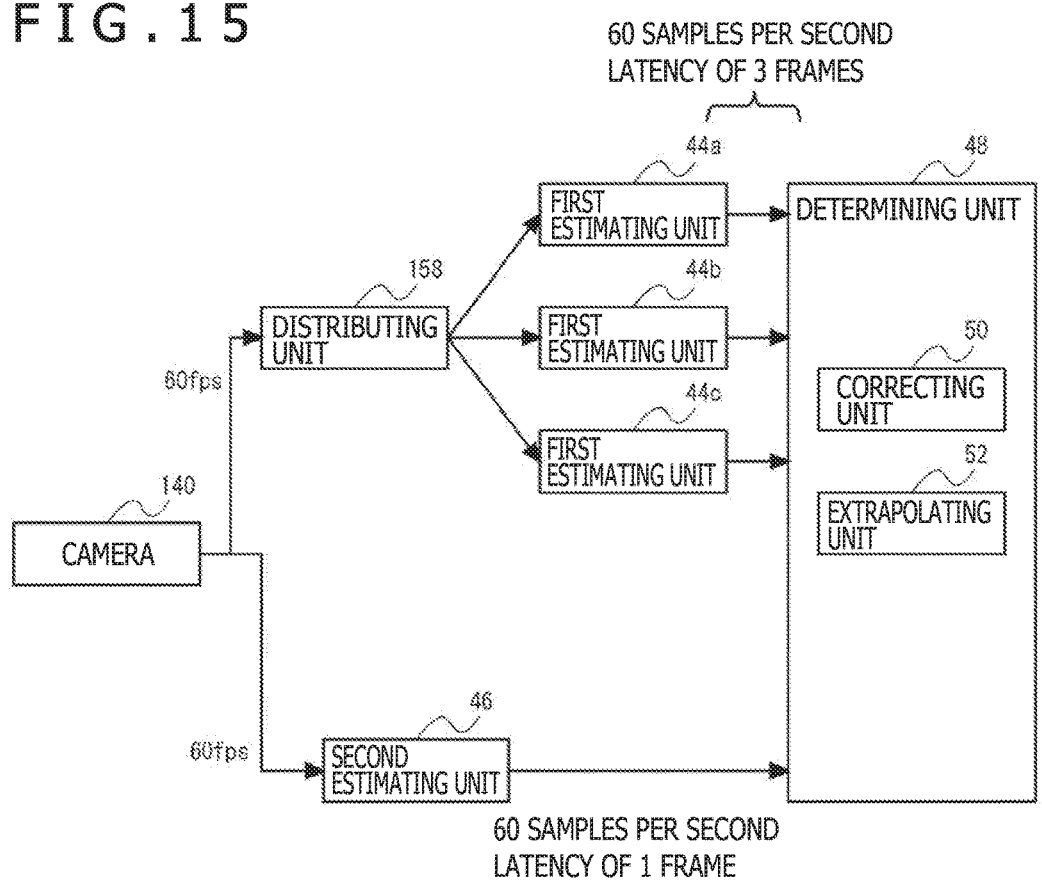
FIG. 15 is a diagram schematically depicting a system according to an eighth modification.

FIG. 15 schematically depicts a system according to the eighth modification. The game machine 200 according to the eighth modification includes a plurality of first estimating units (a first estimating unit 44a, a first estimating unit 44b, and a first estimating unit 44c), one second estimating unit 46, and a distributing unit 158. The plurality of first estimating units may be implemented as a plurality of processes or threads, or a plurality of pieces of first SLAM processing may be performed in parallel with each other in a distributed manner by a plurality of CPUs or GPUs.

The number of first estimating units may be determined on the basis of a difference between a time required for first SLAM processing (time taken from the input of a camera image to the generation of an estimation result) and a time required for second SLAM processing. For example, in a case where the time required for first SLAM processing is six times the time required for second SLAM processing, or in other words, in a case where six second SLAM estimation results are generated before one first SLAM estimation result is generated, six pieces of first SLAM processing may be performed in parallel with each other. In the eighth modification, suppose that, as in the embodiment, the time required for first SLAM processing is three times the time required for second SLAM processing, and three pieces of first SLAM processing are performed in parallel with each other, as in FIG. 15.

The distributing unit 158 equally distributes camera images to the plurality of first estimating units according to a predetermined algorithm such as a round robin algorithm (mod 3 in a case of three in parallel) or the like. The first estimating units 44a to 44c in total output 60 samples per second as first SLAM estimation results as in the case of second SLAM estimation results. The correcting unit 50 detects a difference between a first SLAM estimation result and a second SLAM estimation result associated with same time data, and corrects a second SLAM estimation result subsequent to the second SLAM estimation result from which the difference is detected on the basis of the difference.

As a result of the first SLAM estimation result being output at a high frequency by the parallel processing of the first estimating unit, the correcting unit 50 updates a result of comparison between the first SLAM estimation result and the second SLAM estimation result, or in other words, updates the difference as an object for correction, at a frequency corresponding to the number of parallel first estimating units. That is, the correcting unit 50 detects the difference between the first SLAM estimation result and the second SLAM estimation result and performs correction processing at a higher frequency than the embodiment.

Figure 16:
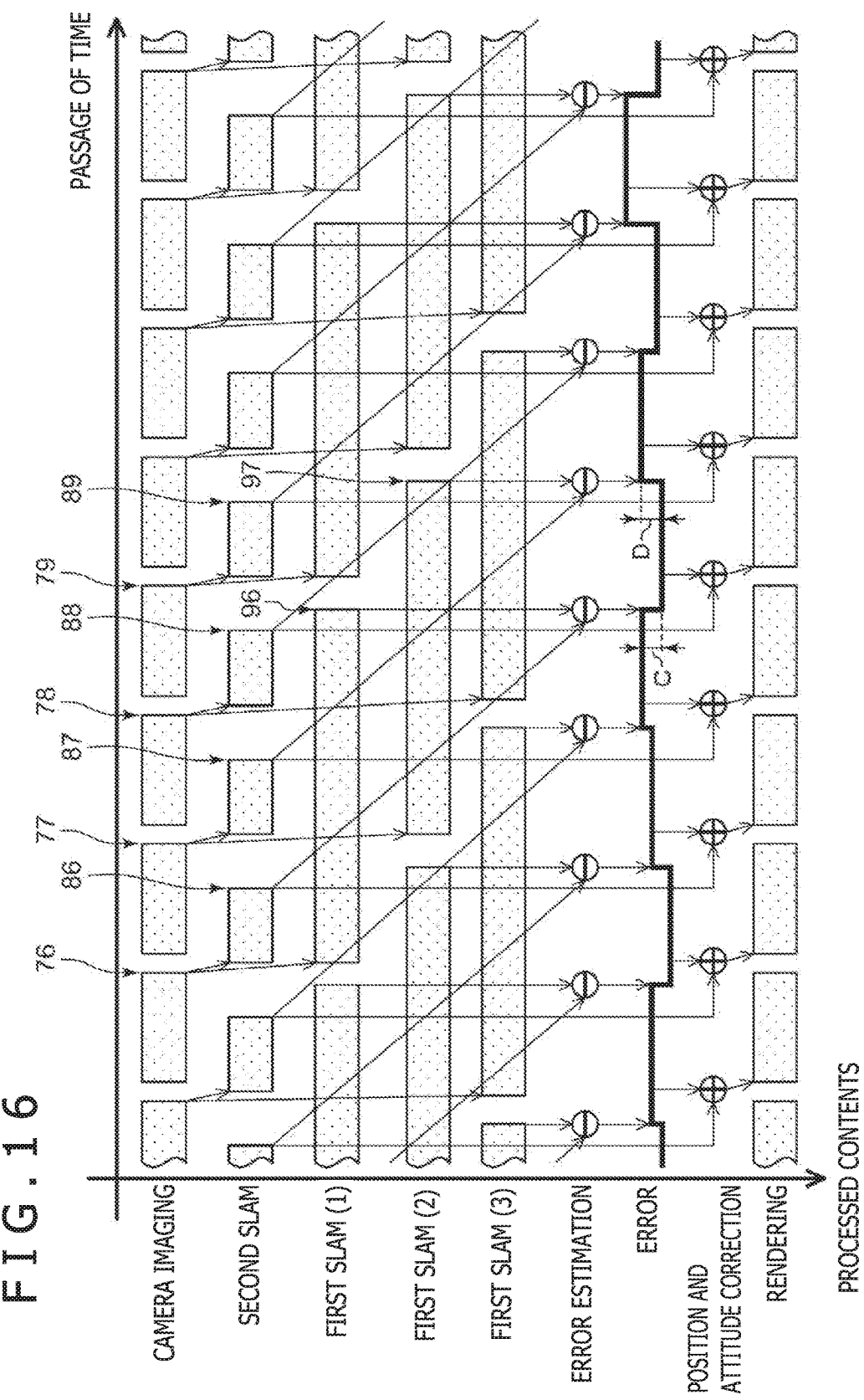
FIG. 16 is a diagram depicting processing up to VR image generation in time series.

FIG. 16 depicts processing up to VR image generation in time series. In the figure, the execution time of each piece of processing is depicted on a time line, and reference numerals denote data generated in each piece of processing. As already described, the second estimating unit 46 performs three times of estimation processing while the first estimating unit 44 performs one time of estimation processing. Therefore, three first estimating units 44 are operated in parallel with each other. The correcting unit 50 estimates an error between a second SLAM estimation result 86 and a first SLAM estimation result 96 based on a camera image 76 as a same source. Suppose here that an error "C" is estimated. The correcting unit 50 corrects a second SLAM estimation result 88 based on a camera image 78, the second SLAM estimation result 88 being subsequent to the second SLAM estimation result 86 as an error estimation object, so as to resolve the error "C."

In addition, the correcting unit 50 estimates an error between a second SLAM estimation result 87 and a first SLAM estimation result 97 based on a camera image 77. Suppose here that an error "D" is estimated. The correcting unit 50 corrects a second SLAM estimation result 89 based on a camera image 79, the second SLAM estimation result 89 being subsequent to the second SLAM estimation result 87 as an error estimation object, so as to resolve the error "D."

In a case where the parallel processing of the first estimating unit 44 is not performed, for example, in the case of FIG. 9, a source for correcting a second SLAM estimation result based on a certain camera image is a difference between a first SLAM estimation result and a second SLAM estimation result based on a camera image preceding by two frames, preceding by three frames, or preceding by four frames. On the other hand, in FIG. 16, a source for correcting a second SLAM estimation result based on a certain camera image is always a difference between a first SLAM estimation result and a second SLAM estimation result based on a camera image preceding by two frames.

In addition, though not depicted, supposing that the parallel processing of the first estimating unit 44 is not performed in a case where the second SLAM estimation result is generated six times before the first SLAM estimation result is generated once, a source for correcting a second SLAM estimation result based on a certain camera image is a difference between a first SLAM estimation result and a second SLAM estimation result based on a camera image preceding by 5 to 10 frames. On the other hand, when six first estimating units 44 are operated in parallel with each other, a source for correcting a second SLAM estimation result based on a certain camera image is always a difference between a first SLAM estimation result and a second SLAM estimation result based on a camera image preceding by five frames.

Thus, according to the configuration of the eighth modification, the frequency of detecting the difference between the first SLAM estimation result and the second SLAM estimation result is increased, and the frequency of correction is also increased. Even when the difference between the first SLAM estimation result and the second SLAM estimation result is increased as an abrupt movement or the like of the HMD 100 occurs, for example, the difference can be resolved quickly. That is, the latest position and attitude of the HMD 100 can be reflected in a VR image more quickly.

A ninth modification will be described. The correcting unit 50 according to the embodiment corrects each of a plurality of second SLAM estimation results so as to gradually resolve a difference between a first SLAM estimation result and a second SLAM estimation result. In addition, in the embodiment, an example has been illustrated in which adjustment values in individual pieces of correction processing are made equal to each other. As a modification, a second SLAM estimation result associated with a time at which a movement of the HMD 100 is detected may be set as a correction object among second SLAM estimation results as correction candidates, and the value of the position and/or attitude may be adjusted. The correcting unit 50 may determine the presence or absence of movement of the HMD 100 on the basis of one or more pieces of sensor data on acceleration, angular velocity, and/or the like.

A difference between a first SLAM estimation result and a second SLAM estimation result can occur even when the HMD 100 is not moving (that is, the head of the user wearing the HMD 100 is not moving). The contents of a VR image based on a position and attitude after correction by the correcting unit 50 are different from the contents of a VR image theretofore displayed. As a result, a manner in which the virtual space looks is changed even though the user is not moving. A feeling of strangeness may therefore be caused to the user. According to the configuration of the ninth modification, a change in the VR image which change accompanies correction processing can be suppressed when the HMD 100 does not move, and therefore the feeling of strangeness of the user can be suppressed. Incidentally, when an error between a first SLAM estimation result and a second SLAM estimation result which error is detected at a certain point in time is not resolved before a next error is detected, the correcting unit 50 may discard the error yet to be resolved (in a process of being resolved), and perform correction processing by applying the newly detected error.

A tenth modification will be described. The state identifying unit 36 according to the embodiment includes the first estimating unit 44 (first SLAM) that has a low speed but generates a result not including an accumulated error and the second estimating unit 46 (second SLAM) that has a high speed but generates a result including an accumulated error. As a modification, the state identifying unit 36 may include SLAM having other characteristics. As a concrete example, the state identifying unit 36 according to the tenth modification includes a first estimating unit 44 (first SLAM) that generates a result not including an accumulated error but having a relatively low short-term accuracy and a second estimating unit 46 (second SLAM) that generates a estimation result including an accumulated error but having a relatively high short-term accuracy.

The second estimating unit 46 according to the present modification generates, as an estimation result in a short period, an estimation result having a higher accuracy than the estimation result of the first estimating unit 44. For example, difference information (relative position information) from a previous estimation result generated by the second estimating unit 46 has a higher accuracy than absolute position information generated by the first estimating unit 44. Here, the short period is, for example, less than 5 seconds, and is, for example, less than a time taken to perform 100 times of self-position estimation processing. Incidentally, suppose in the present modification that a difference in speed of one time of estimation processing between first SLAM and second SLAM is of no concern, and that processing speeds of first SLAM and second SLAM are the same in the following.

As in the embodiment, the estimation result of the second estimating unit 46 includes an accumulated error, and therefore a deviation width between the estimation result of the second estimating unit 46 and a true value tends to be increased with the passage of time. However, a highly accurate estimation result remains when the accumulated error is removed. Accordingly, as in the embodiment, the estimation result of the first estimating unit 44 is used to remove the accumulated error from the estimation result of the second estimating unit 46. However, the estimation result of the first estimating unit 44 has a relatively low short-term accuracy, or in other words, has a relatively large short-term error. Accordingly, the first estimating unit 44 (that may be another block such as the correcting unit 50 or the like) according to the present modification smooths a plurality of estimation results in a temporal direction.

Specifically, the first estimating unit 44 may output, as an estimation result after smoothing, an average value of a plurality of estimation processing results based on a plurality of camera image inputs. Publicly known averaging processing such as moving average processing or the like may be performed. In addition, estimation results including a short-term error may be smoothed by performing publicly known filtering processing (Kalman filter or the like). Smoothing can also be said to be removal of a high-frequency component included in the estimation results. When the plurality of estimation results are smoothed, the output of the estimation result from the first estimating unit 44 is delayed as a result. For example, even when the duration of one time of estimation processing by the first estimating unit 44 is 15 milliseconds as in the second estimating unit 46, in a case where smoothing processing is performed on the basis of three estimation results, the first estimating unit 44 requires 45 milliseconds to obtain an estimation result after smoothing, as in the embodiment.

As in the embodiment, the correcting unit 50 compares an estimation result of the first estimating unit 44 and an estimation result of the second estimating unit 46 with each other, and corrects a subsequent estimation result of the second estimating unit 46 on the basis of a result of the comparison. For example, a difference between the estimation result of the first estimating unit 44 and the estimation result of the second estimating unit 46 is detected, and the subsequent estimation result of the second estimating unit 46 is corrected so as to resolve the difference. An accumulated error is thereby removed from the estimation result of the second estimating unit 46, so that a highly accurate position and attitude estimation result can be obtained.

An eleventh modification will be described. Though not mentioned in the embodiment, when the correcting unit 50 detects an error between a first SLAM estimation result and a second SLAM estimation result, the correcting unit 50 may feed back information indicating the error to the second estimating unit 46. The second estimating unit 46 may correct the theretofore constructed ambient environment information on the basis of the error fed back from the correcting unit 50. That is, when the error between the first SLAM estimation result and the second SLAM estimation result is detected, the second estimating unit 46 may reset an error theretofore accumulated by the second estimating unit 46 itself on the basis of the detected error. Consequently, the ambient environment information of the second estimating unit 46 which information includes the accumulated error can be synchronized with the ambient environment information constructed by the first estimating unit 44.

A twelfth modification will be described. In the information processing system 210 according to the embodiment, the position and attitude of the HMD 100 is estimated to generate an appropriate VR image to be displayed by the HMD 100. The self-position estimation technology described in the present specification (the embodiment and the foregoing modifications) is not limited to the generation of a VR image, but is effective in generating an AR image according to the position and attitude of the HMD 100. In this case, the HMD 100 may be an optical transmissive HMD that transmits visible light from the front (in other words, the sight line direction of the user). In addition, the video of the outside imaged by the camera 140 may be displayed on the display 22 with a delay according to the latency of AR image generation, and an AR image may be displayed so as to be superimposed on the video of the outside.

A thirteenth modification will be described. The self-position estimation technology described in the present specification is not limited to HMDs, but is applicable to various devices and systems that should perform appropriate information processing according to the position and/or attitude of a predetermined object. For example, the App executing unit 38 in FIG. 4 can be replaced with blocks that perform various kinds of information processing of other than a game on the basis of a result of self-position estimation by the state identifying unit 36.

Vehicle-mounted devices and drones are cited as an example of applications of the self-position estimation technology described in the present specification. The drones include remote-controlled or autonomous mobile machines in general, and, for example, include unmanned vehicles, unmanned aircrafts, and unmanned ships. Of course, the drones include remote-controlled or autonomous quadcopters and multicopters. When the self-position estimation technology described in the present specification is applied to a vehicle-mounted device or a drone, the position and attitude of an automobile (or the drone) can be grasped quickly and accurately on the basis of an image of a camera attached to an external surface of the automobile (or the drone). It is then possible to perform high-quality automatic driving processing or navigation processing based on real-time position and attitude information.

Arbitrary combinations of the embodiment and the modifications described above are also useful as embodiments of the present invention. New embodiments created by the combinations combine the respective effects of the embodiment and the modifications combined with each other. In addition, it is to be understood by those skilled in the art that functions to be performed by respective constituent elements described in claims are implemented by single bodies of the respective constituent elements illustrated in the embodiment and the modifications or cooperation of the constituent elements.

REFERENCE SIGNS LIST

40 Camera image obtaining unit, 42 Sensor data obtaining unit, 44 First estimating unit, 46 Second estimating unit, 50 Correcting unit, 56 State data providing unit, 60 State data obtaining unit, 62 Image generating unit, 64 Image providing unit, 100 HMD, 140 Camera, 200 Game machine, 210 Information processing system

INDUSTRIAL APPLICABILITY

The present invention is applicable to devices that estimate at least one of a position and an attitude of an object.

The invention claimed is:

1. An information processing device comprising:
a first estimating unit configured to estimate at least one of a position and an attitude of a predetermined object on a basis of an image of a periphery of the object, the image being obtained from an imaging device, and generate an estimation result not including an accumulated error;
a second estimating unit configured to estimate at least one of the position and the attitude of the object on the basis of the image, and generate an estimation result including an accumulated error;
a correcting unit configured to compare the estimation result of the first estimating unit and the estimation result of the second estimating unit with each other, and correct, on a basis of a result of the comparison, a subsequent estimation result of the second estimating unit, the subsequent estimation result being subsequent to the estimation result of the second estimating unit, the estimation result being used for the comparison; and
a data processing unit configured to perform predetermined data processing on a basis of the estimation result of the second estimating unit, the estimation result being corrected by the correcting unit.

2. The information processing device according to claim 1, wherein the second estimating unit estimates at least one of the position and the attitude of the object more quickly than the first estimating unit.

3. The information processing device according to claim 1, wherein accuracy of the estimation result of the second estimating unit in a short period is higher than accuracy of the estimation result of the first estimating unit in the short period.

4. The information processing device according to claim 1, wherein the correcting unit obtains a difference between the estimation result of the first estimating unit and the estimation result of the second estimating unit, and corrects the subsequent estimation result of the second estimating unit, the subsequent estimation result being subsequent to the estimation result of the second estimating unit, the difference being obtained from the estimation result of the second estimating unit, so as to resolve the difference.

5. The information processing device according to claim 4, wherein
the second estimating unit performs a plurality of times of estimation processing based on a plurality of images imaged by the imaging device during one time of estimation processing of the first estimating unit, and the correcting unit corrects each of a plurality of subsequent estimation results of the second estimating unit, the subsequent estimation results being subsequent to the estimation result of the second estimating unit, the difference being obtained from the estimation result of the second estimating unit, so as to resolve the difference between the estimation result of the first estimating unit and the estimation result of the second estimating unit gradually during a period from obtainment of the difference to obtainment of a next estimation result of the first estimating unit.

6. The information processing device according to claim 1, wherein the first estimating unit and the second estimating unit estimate at least one of the position and the attitude of the object on a basis of an image imaged by an identical imaging device.

7. The information processing device according to claim 1, wherein the first estimating unit estimates at least one of the position and the attitude of the object on a basis of an image of relatively high image quality, and the second estimating unit estimates at least one of the position and the attitude of the object on a basis of an image of relatively low image quality, and the image of the high image quality and the image of the low image quality are images imaged by an identical imaging device or different imaging devices.

8. The information processing device according to claim 1, further comprising:

an image obtaining unit configured to obtain a plurality of individual images imaged by a plurality of imaging devices performing imaging in different directions, wherein the first estimating unit estimates at least one of the position and the attitude of the object on a basis of a composite image obtained by synthesizing the plurality of individual images, and the second estimating unit estimates at least one of the position and the attitude of the object on a basis of at least one of the plurality of individual images.

9. The information processing device according to claim 1, wherein the first estimating unit estimates at least one of the position and the attitude of the object on a basis of an image imaged by an imaging device of a rolling shutter type, and the second estimating unit estimates at least one of the position and the attitude of the object on a basis of an image imaged by an imaging device of a global shutter type.

10. The information processing device according to claim 1, wherein the second estimating unit estimates at least one of the position and the attitude of the object on a basis of part of an image used by the first estimating unit.

11. The information processing device according to claim 1, wherein the second estimating unit performs a plurality of times of estimation processing based on a plurality of images imaged by the imaging device during one time of estimation processing of the first estimating unit, the first estimating unit performs a plurality of times of estimation processing based on the plurality of images imaged by the imaging device in parallel with each other, and when an estimation result is output in each piece of parallel estimation processing by the first estimating unit, the correcting unit updates the comparison result between the estimation result of the first estimating unit and the estimation result of the second estimating unit.

12. A position and/or attitude estimating method performed by a computer, the method comprising:

performing first estimation processing that estimates at least one of a position and an attitude of a predetermined object on a basis of an image of a periphery of the object, the image being obtained from an imaging device, and generates an estimation result not including an accumulated error;

performing second estimation processing that estimates at least one of the position and the attitude of the object on the basis of the image, and generates an estimation result including an accumulated error; and comparing the estimation result of the first estimation processing and the estimation result of the second estimation processing with each other, and correcting, on a basis of a result of the comparison, a subsequent estimation result of the second estimation processing, the subsequent estimation result being subsequent to the estimation result of the second estimation processing, the estimation result being used for the comparison.

13. A non-transitory, computer readable storage medium containing a computer program, which when executed by a computer, causes the computer to carry out actions, comprising:

by a first estimating unit, estimating at least one of a position and an attitude of a predetermined object on a basis of an image of a periphery of the object, the image being obtained from an imaging device, and generating an estimation result not including an accumulated error;

by a second estimating unit, estimating at least one of the position and the attitude of the object on the basis of the image, and generating an estimation result including an accumulated error;

by a correcting unit, comparing the estimation result of the first estimating unit and the estimation result of the second estimating unit with each other, and correcting, on a basis of a result of the comparison, a subsequent estimation result of the second estimating unit, the subsequent estimation result being subsequent to the estimation result of the second estimating unit, the estimation result being used for the comparison; and by a data processing unit, performing predetermined data processing on a basis of the estimation result of the second estimating unit, the estimation result being corrected by the correcting unit.

* * * * *